United States Patent
Nakagawa et al.

(10) Patent No.: US 9,278,467 B2
(45) Date of Patent: Mar. 8, 2016

(54) GOLF BALL MOLD AND GOLF BALL MANUFACTURING METHOD

(75) Inventors: Takuma Nakagawa, Chichibushi (JP); Katsunori Sato, Chichibushi (JP)

(73) Assignee: BRIDGESTONE SPORTS CO., LTD., Tokyo (JP)

(*) Notice: Subject to any disclaimer, the term of this patent is extended or adjusted under 35 U.S.C. 154(b) by 1048 days.

(21) Appl. No.: 13/331,357

(22) Filed: Dec. 20, 2011

(65) Prior Publication Data

US 2013/0154156 A1 Jun. 20, 2013

(51) Int. Cl.
*B29C 45/14* (2006.01)
*B29L 31/54* (2006.01)
*B29C 45/37* (2006.01)

(52) U.S. Cl.
CPC ..... *B29C 45/14073* (2013.01); *B29C 45/14819* (2013.01); *B29C 45/372* (2013.01); *B29L 2031/546* (2013.01)

(58) Field of Classification Search
CPC .............. B20C 45/14; B29C 45/14065; B29C 45/14073; B29C 2045/14147
USPC .................................................. 264/278, 275
See application file for complete search history.

(56) References Cited

U.S. PATENT DOCUMENTS

| | | | |
|---|---|---|---|
| 6,129,881 A | 10/2000 | Puniello | |
| 6,238,194 B1* | 5/2001 | Inoue et al. | 425/116 |
| 7,341,687 B2 | 3/2008 | Puniello et al. | |
| 7,704,431 B2 | 4/2010 | Endo et al. | |
| 2002/0096801 A1* | 7/2002 | Puniello et al. | 264/278 |

FOREIGN PATENT DOCUMENTS

| | | |
|---|---|---|
| JP | 8-300403 A | 11/1996 |
| JP | 2002-542067 A | 12/2002 |
| JP | 2005-143610 A | 6/2005 |

* cited by examiner

*Primary Examiner* — Christina Johnson
*Assistant Examiner* — Xue Liu
(74) *Attorney, Agent, or Firm* — Sughrue Mion, PLLC

(57) ABSTRACT

A golf ball mold body having a plurality of mold parts with a parting surface defining a parting line along an equator and removably mating to form a cavity having an inner wall with dimple-forming protrusions, and a support pin extendable into and retractable from the cavity, the support pin extending into the cavity to support a center sphere. An end face of the support pin defines a portion of the cavity inner wall when the support pin is retracted. The support pin has a shape satisfying certain conditions, and the support pin and mold body have a gap therebetween set within a specific range. The invention minimizes formation of uneven flash caused by deflection or shifting of support pins, appearance defects caused by damage to the cavity inner wall and contamination by rubbing debris, and the life of the mold is extended.

6 Claims, 25 Drawing Sheets

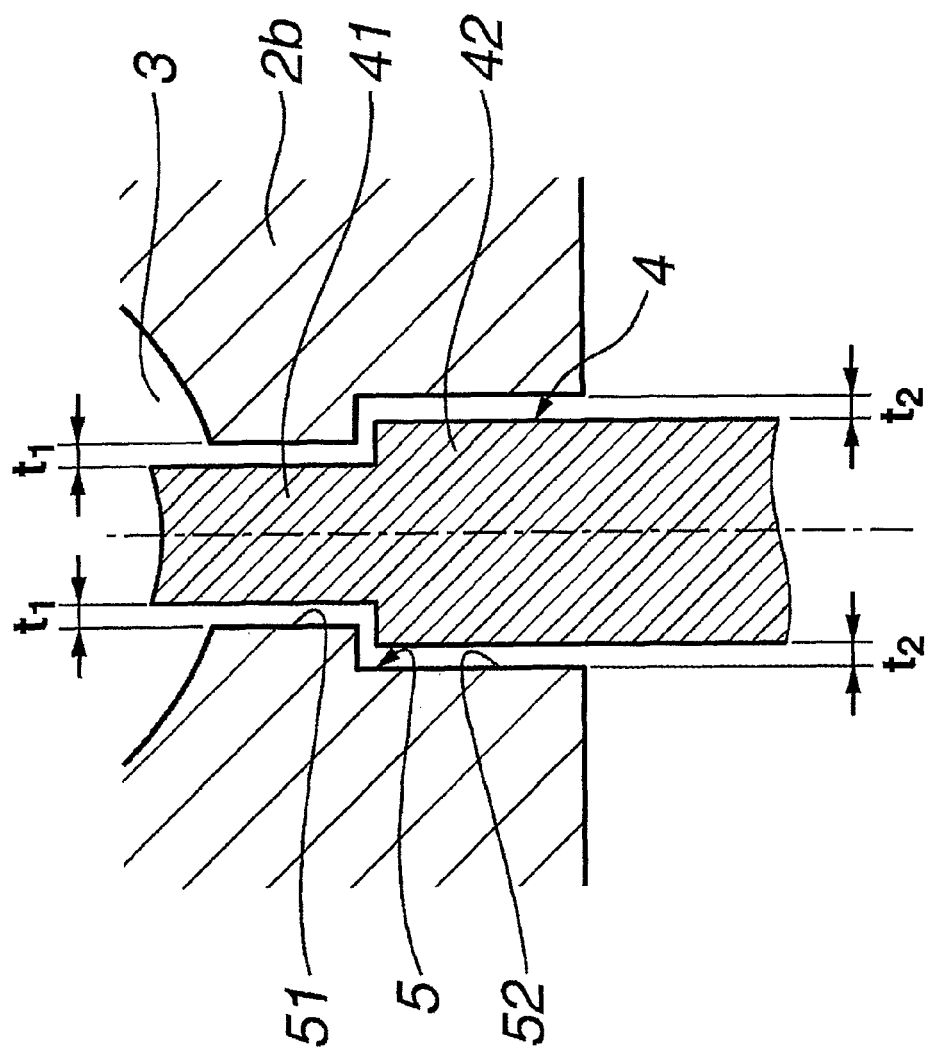

US 9,278,467 B2

GOLF BALL MOLD AND GOLF BALL MANUFACTURING METHOD

BACKGROUND OF THE INVENTION

The present invention relates to a golf ball mold and a golf ball manufacturing method which may be suitably used for molding golf balls composed of a core encased by a cover of one, two or more layers, particularly for forming an outermost cover layer having a plurality of dimples formed on the surface thereof.

In recent years, there has been a strong desire for various performance attributes in golf balls, including not only distance, but also controllability, durability and feel on impact. Satisfying all of these attributes with only one type of material is generally difficult. Hence, the customary practice is to provide the ball with a structure in which a solid core formed of rubber, resin or the like, or a wound core, is encased by a cover of one, two or more layers, each layer having a particular function. In other words, efforts have been made to achieve a performance which addresses the needs of the player, such as a desire primarily for distance or for controllability, by adjusting the number and thickness of the above layers, and also by adjusting the formulations, etc. of the materials making up the respective layers.

An injection-molding method is typically used to form the outermost layer of a golf ball having such a structure. Specifically, use is made of a method in which a core or a sphere (referred to below as a "center sphere") composed of such a core encased by one or more intermediate layer (a layer other than the outermost cover layer) is placed in the cavity of a given mold, and a cover-forming material is injected between the center sphere and the inner wall of the cavity. In this case, when the outermost layer is formed, numerous dimples are formed at the same time by numerous dimple-forming protrusions which have been provided on the inner wall of the cavity.

Up until now, molds having the structure shown in FIG. 22 have commonly been used when producing golf balls by the above process. FIG. 22, which is a cross-sectional view showing an example of a golf ball mold according to the prior art, depicts the state prior to injection of the cover-forming material into the cavity.

In FIG. 22, a conventional mold 10 is equipped with a mold body 20 having an upper mold half 20a and a lower mold half 20b which split at a parting surface that defines a parting line PL at a golf ball equator and removably mate to form a cavity 3 having an inner wall with numerous dimple-forming protrusions thereon, and support pins 40 which can be extended and retracted within pin insertion holes 50 that communicate with the cavity 3. The support pins 40, each of which is provided on an end face thereof with a single dimple-forming protrusion, extend into the cavity to support a center sphere 31. When the support pins 40 are in the retracted state, the end faces thereof define a portion of the inner wall of the cavity 3. Moreover, although not shown here, each support pin 40 has a circular cross-section, and three pins each are provided in the upper mold half 20a and the lower mold half 20b, for a total of six pins, so as to be spaced at given intervals at positions having 120 degree rotational symmetry about poles Q of the cavity 3 as the center.

In the above mold 10, runners 60 and resin injection ports 70 having openings of given surface areas are formed along the parting surface of the mold body 20 in such a way as to inject, between the inner wall of the cavity 3 and the center sphere 31, a known cover-forming material from a known injection molding machine (not shown). Next, together with injection of the cover-forming material, the support pins 40 that were extended into the cavity 3 are retracted, after which cooling is carried out, thereby completing formation of the cover. The dimples at the positions of the support pins 40 are formed at this time by the dimple-forming protrusions that have been formed on the end faces of the support pins. Gases within the cavity 3 are discharged through gaps arranged at given intervals that have been provided between the support pins 40 and the pin insertion holes.

However, when the center sphere 31 is placed in the mold 10 and the upper and lower mold halves are closed, the support pins 40 are often subjected to excessive forces, causing them to deflect or shift. In such cases, the support pins 40 move away from the center of their respective pin insertion holes 50, causing the gap between each pin and its hole to become uneven. Hence, during molding, material entry is concentrated at places where the gap between the two is wide, as a result of which flash forms unevenly on the surface of the molded ball. When uneven flash forms on the ball's surface, uniformly trimming the overall ball is not easy, making a clean appearance difficult to obtain. Moreover, this may also lead to a loss of dimple uniformity and ultimately have an adverse effect on flight symmetry.

Moreover, because strong chafing arises at specific places owing to contact between the support pin 40 and the pin insertion hole 50, at the off-center position of the pin 40, rubbing debris tends to form. When molding cycles are repeated in such a state, the rubbing debris that has formed may enter into the cavity 3 and ultimately contaminate the molded ball. Moreover, due to chafing between the support pins 40 and the mold body 20, abrasion of the inner wall side of the cavity 3 occurs, which may give rise to appearance defects in the molded ball.

Hence, problems caused by shifting of the support pins and abrasion can have a major influence on the quality of the finished product and on the maintenance period and life of the mold, and are thus a concern that directly impacts the cost of the product.

In order to resolve such problems relating to appearance defects and the like, JP-A 2002-542067 (and the corresponding U.S. Pat. No. 6,129,881), U.S. Pat. No. 7,341,687, JP-A 08-300403 and JP-A 2005-143610 disclose molds wherein the venting of gases near the poles of the mold cavity is improved by providing gas-venting pins in the mold body and in large-diameter support pins. However, the gas-venting pins and the support pins in such molds must be separately fabricated, resulting in additional costs. Moreover, such molds do not resolve the above problems caused by abrasion.

In this way, various modifications have hitherto been made to golf ball molds in order to improve the golf ball moldability and the mold life, but a fundamental solution has yet to be found for the above problems. Accordingly, for the sake of further enhancing golf ball moldability and mold life, and thus achieving further improvement in quality and lower costs, there has existed a desire for a novel approach which is capable of resolving the above problems.

SUMMARY OF THE INVENTION

It is therefore an object of the present invention to provide a golf ball mold which, particularly during formation of the outermost cover layer of a golf ball, minimizes abrasion of the mold body and support pins, thus extending the life of the mold, and also suppresses to the extent possible the occurrence of appearance defects and undesirable flash caused by such abrasion, thereby enabling stable molding to be carried out without giving rise to the production problems described above. A further object of the invention is to provide a method of manufacturing golf balls using such a mold.

To achieve the above object, the invention provides the following golf ball mold and golf ball manufacturing method.

[1] A mold for molding golf balls, comprising a mold body configured as a plurality of mold parts which have at least a parting surface defining a parting line along a golf ball equator and removably mate to form a cavity having an inner wall with a plurality of dimple-forming protrusions thereon, and a support pin which is extendable into and retractable from the cavity, the support pin extending into the cavity to support a center sphere and an end face of the support pin defining a portion of the cavity inner wall when the support pin is in a retracted state, wherein the support pin comprises a pin body which extends into the cavity to support the center sphere and has an end face that defines a portion of the cavity inner wall when the support pin is in a retracted state, and a guide body which is of larger cross-section than the pin body and has an end face from which the pin body projects;

the mold body has formed therein a pin insertion hole comprising a pin insertion portion into which the pin body fits and a guide portion into which the guide body fits; and the guide body and the guide portion have a gap therebetween and the pin body and the pin insertion portion have a gap therebetween, such that the gap between the guide body and the guide portion is smaller than the gap between the pin body and the pin insertion portion.

[2] The golf ball mold of [1], wherein the gap between the guide body and the guide portion is not more than one-half as large as the gap between the pin body and the pin insertion portion.

[3] The golf ball mold of [1], wherein the guide body has formed, on a sidewall thereof, at least one groove which communicates with a mold exterior.

[4] The golf ball mold of [1], wherein the guide portion has formed, on an inside wall thereof, at least one groove which communicates with a mold exterior.

[5] The golf ball mold of claim 1, wherein the pin body is shaped in such a way that the end face thereof has one or more dimple-forming protrusion thereon.

[6] The golf ball mold of [5], wherein the pin body is shaped in such a way that the end face thereof has two or more dimple-forming protrusions thereon.

[7] The golf ball mold of [1], wherein the end face of the pin body includes a pole of the cavity and has a peripheral edge which intersects a parallel of latitude at 10 degrees from the pole.

[8] A method of manufacturing a golf ball using the golf ball mold of [1], comprising the step of molding a cover by placing a center sphere in a mold cavity formed by removably mating a plurality of mold parts which have at least a parting surface defining a parting line along a golf ball equator and supporting the center sphere with a support pin provided in the mold, then injecting a cover-forming material between the center sphere and the cavity inner wall while at the same time retracting the support pin.

The golf ball mold of the invention, by being equipped with support pins having a shape that satisfies certain conditions, provides the advantage that deflection or shifting of the support pins during molding can be suppressed, and abrasion of the mold body and support pins can be minimized. Consequently, the formation of uneven flash caused by the deflection or shifting of support pins, appearance defects in the molded article caused by damage to the cavity inner wall and contamination of the molded article by rubbing debris can be minimized, in addition to which the life of the mold can be extended. As a result, good molded articles can be obtained without interruption, helping to increase golf ball productivity. Moreover, the inventive mold also has cost advantages in that there is no need to separately manufacture the gas venting pins that are described in the prior art.

BRIEF DESCRIPTION OF THE DIAGRAMS

FIG. 1 presents cross-sectional views of a golf ball mold according to an embodiment of the invention, FIG. 1A being a cross-sectional view showing the overall structure of the mold and FIG. 1B being an enlarged cross-sectional view of the vicinity of a pin insertion hole in FIG. 1A.

DETAILED DESCRIPTION OF THE INVENTION

The golf ball mold of the invention is described more fully below in conjunction with the appended diagrams. The "parting line" and "parting surface" of the mold, as used in the description below, are defined as follows. The "parting line" is a line that serves as a reference when the mold splits into a plurality of parts. For example, in the case of a mold that splits into two parts, the parting line refers to a line that serves as a reference for the mating of the upper mold half with the lower mold half, and is rectilinear. The "parting surface" of the mold refers to the area of contact when the respective mold parts that have been separated based on the above parting line are joined together. In a case where dimple-forming protrusions which lie across the parting line are provided on the parting surface, the parting surface has convex features due to the dimple-forming protrusions and also has concave features which correspond to the convex features. In the present invention, the shape of the parting surface may be suitably set according to the mold specifications, and is not subject to any particular limitation.

It is sufficient for the golf ball mold of the invention to have at least a parting surface that defines a parting line along a golf ball equator; the number of parts into which the mold splits may be suitably set according to the mold specifications, and is not subject to any particular limitation. For example, when the number of parting surfaces in the mold is small, such as in a two-part mold having a single parting surface, mold production costs and constraints on the dimple configuration can be reduced. On the other hand, in cases where a plurality of parting surfaces are provided and the mold splits into a larger number of parts, the mold release properties of the molded article can be improved. The inventive mold is characterized in that one or more support pin which satisfies certain conditions has been provided. The number, positions and other characteristics of the support pins may be suitably set according to such considerations as the mold specifications and the dimple design of the golf balls to be molded, and are not subject to any particular limitation. For the sake of simplicity, the mold described below in order to illustrate the invention is a two-part mold wherein the mold body splits into an upper mold half and a lower mold half along the golf ball equator as the parting line, and the upper mold half and low mold half are each provided with one support pin satisfying the conditions of the invention.

Figure 1A:
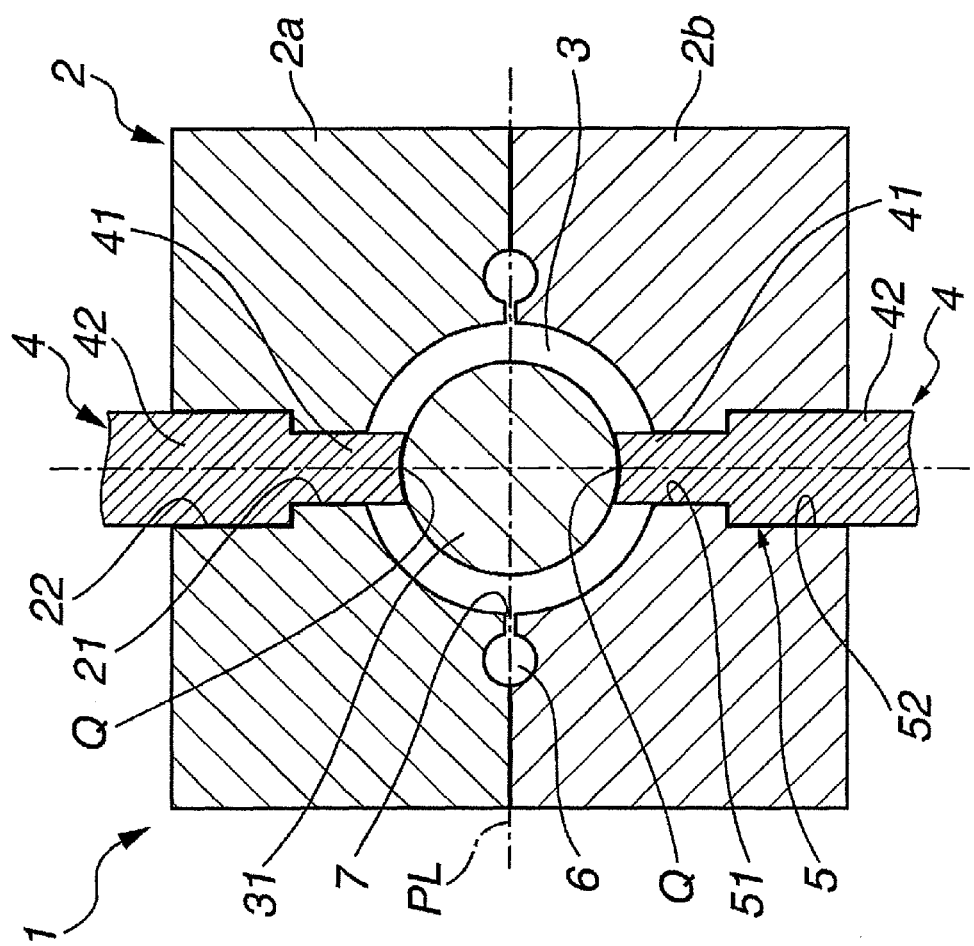

FIG. 1 shows an embodiment of the golf ball mold according to the present invention. FIG. 1A is a cross-sectional view of a golf ball mold according to one embodiment of the invention. FIG. 1B is an enlarged cross-sectional view of the vicinity of a pin insertion hole illustrating the relationship between the support pin and the pin insertion hole in FIG. 1A (FIG. 1B is not a diagram depicting operation of the support pin during molding. Also, the gaps between the support pins and the pin insertion holes are not shown to scale.). The mold 1 shown here includes a mold body 2 configured as an upper mold half 2a and a lower mold half 2b which have a parting surface defining a parting line PL along a golf ball equator and removably mate to form a cavity 3 having an inner wall with a plurality of dimple-forming protrusions thereon, and support pins 4 which are extendable into and retractable from the cavity 3. Each support pin 4 has a pin body 41 which extends into the cavity 3 to support a center sphere 31 and an end face of which defines a portion of the inner wall of the cavity 3 when the support pin 4 is in a retracted state, and a guide body 42 of larger cross-section than the pin body 41, the support pin being configured such that the pin body 41 projects monolithically from an end face of the guide body 42. In addition, as shown in FIG. 1B, the mold body 2 has formed therein a pin insertion hole 5 having a pin insertion portion 51 which interfits with the pin body 41 and a guide portion 52 which interfits with the guide body 42. Moreover, runners 6 and resin injection ports 7 having openings of given surface areas are formed along the parting surface of the mold body 2 in such a way as to inject, between the inner wall of the cavity 3 and the center sphere 31, a known cover-forming material from a known injection molding machine (not shown). When the cover-forming material has been injected, gases within the cavity 3 are released to the exterior through gaps between the mold body 2 and the support pins 4.

Here and below, the symbol $t_1$ in FIG. 1B represents the gap between the pin body 41 and the pin insertion portion 51, and denotes a gap extending circumferentially between the periphery of a sidewall of the pin body 41 and an inner wall of the pin insertion portion 51. Similarly, the symbol $t_2$ represents the gap between the guide body 42 and the guide portion 52, and denotes a gap extending circumferentially between the periphery of a sidewall of the guide body 42 and an inner wall of the guide portion 52.

In the mold 1 of the invention, the gap $t_2$ between the guide body 42 and the guide portion 52 must be narrower than the gap $t_1$ between the pin body 41 and the pin insertion portion 51. In particular, it is recommended that $t_2$ be set to not more than one-half the size of the gap $t_1$ between the pin body 41 and the pin insertion portion 51. Further details are described later in the specification.

Figure 2:
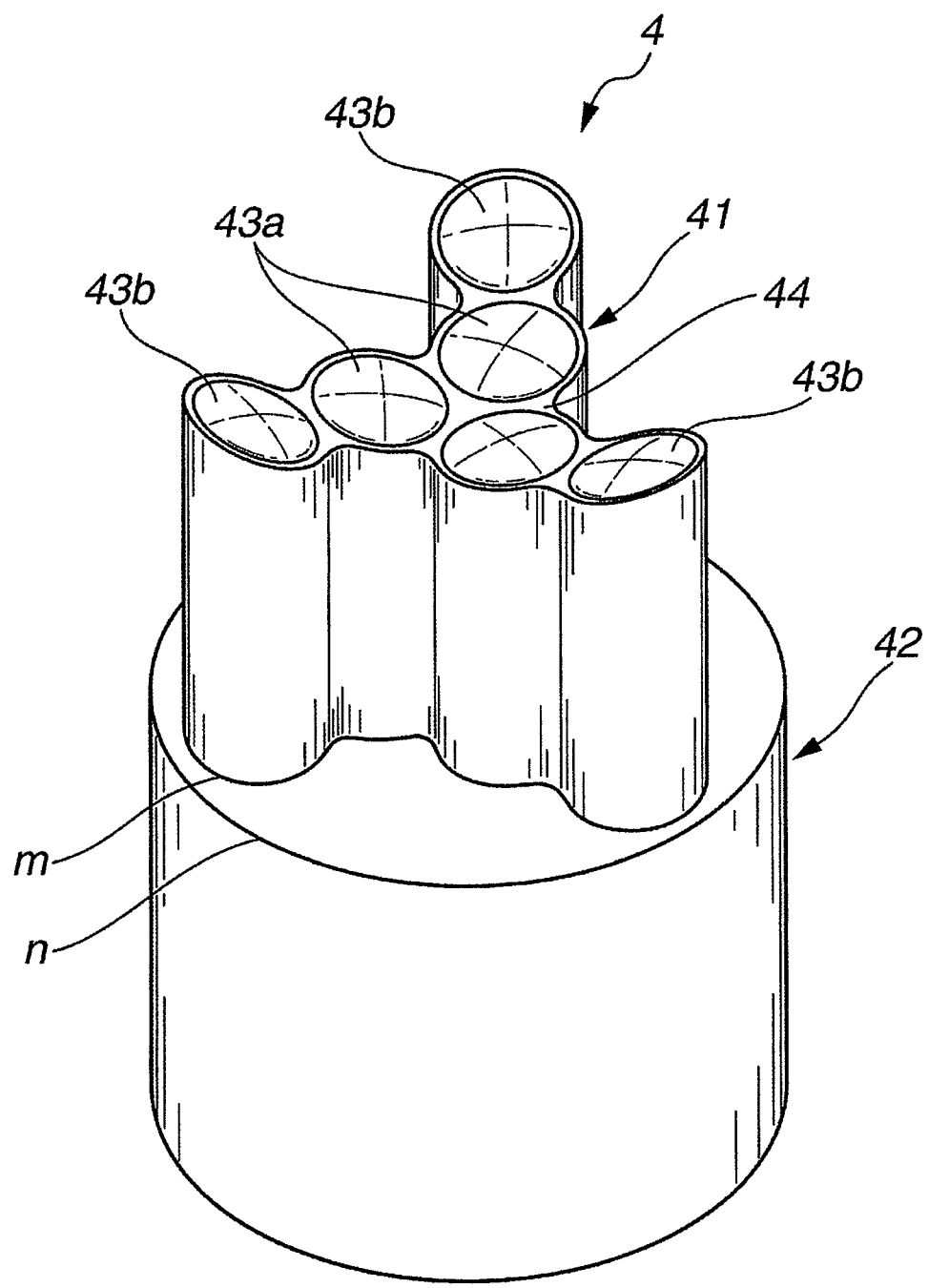
FIG. 2 is an enlarged perspective view of the vicinity of an end portion of a support pin in the golf ball mold shown in FIG. 1.

Also, in this invention, the statement that the guide body 42 is "of larger cross-section than the pin body 41" signifies a state in which, referring to FIG. 2 by way of example, a margin m of the pin body 41 and a peripheral edge n of the end face of the guide body 42 are separated by a given interval over the entire circumference; that is, a state in which, as seen from above, the pin body 41 is completely included within the end face of the guide body 42. In the invention, the interval between the margin m of the pin body 41 and the peripheral edge n of the end face of the guide body 42 may be suitably set according to such considerations as the mold specifications, and is not subject to any particular limitation. Also, the pin body 41 and the guide body 42 have cross-sectional shapes which may be similar to each other or which may differ.

In FIG. 1A, the pin body 41 is configured so as to, when extended into the cavity 3, support the center sphere 31, and such that, when in a retracted state after injection of the cover-forming material, the end face thereof defines a portion of the inner wall of the cavity 3.

Support pin 4 shapes which may be employed in the golf ball mold 1 of the invention are described in detail below while providing specific examples.

Figure 3:
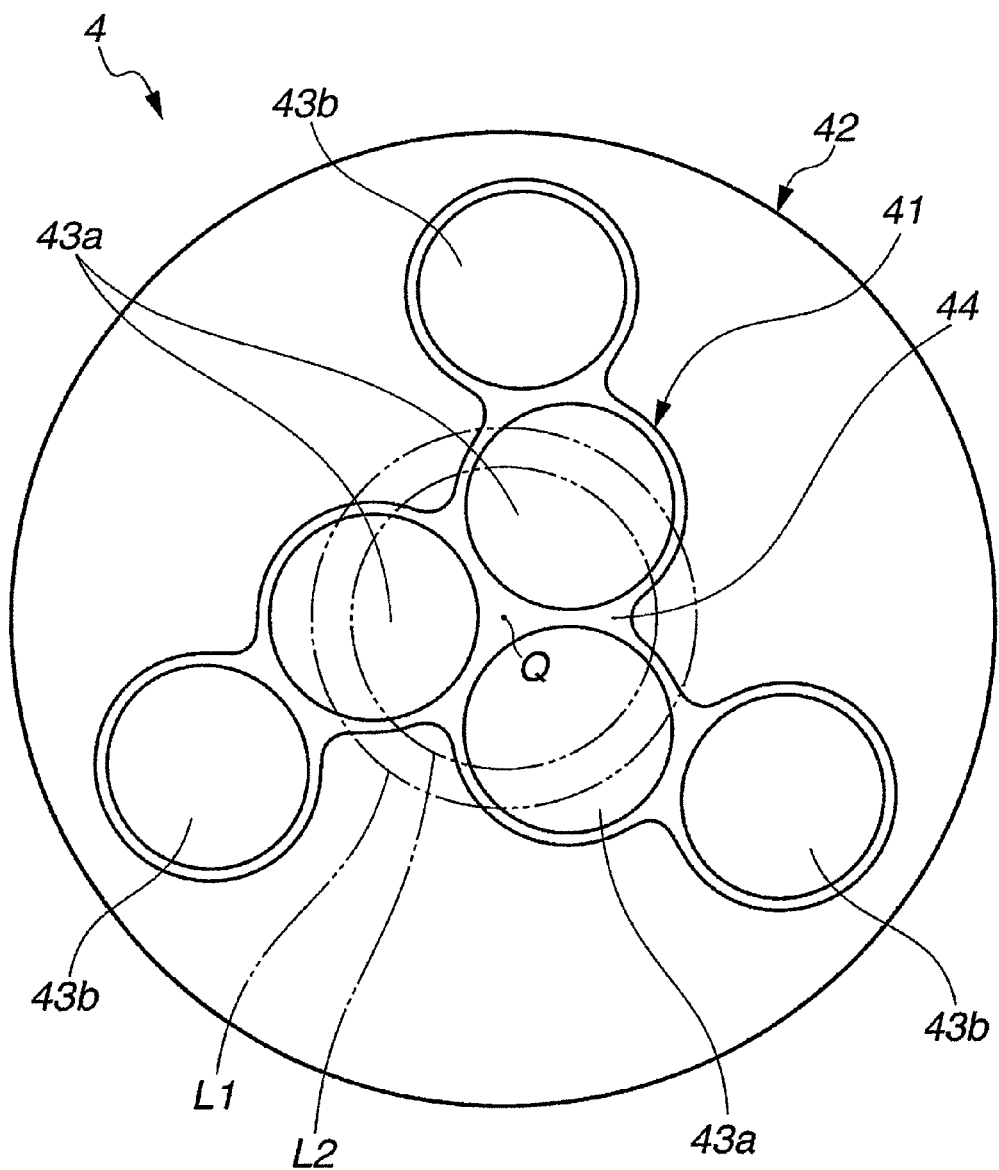
FIG. 3 is a plan view of the support pin shown in FIG. 2, as seen from an end face side thereof.

FIGS. 2 and 3 show an example of a support pin 4 shape which satisfies the conditions of the invention. FIG. 2 is an enlarged perspective view of the vicinity of an end portion of a support pin 4, and FIG. 3 is a plan view of the support pin 4 shown in FIG. 2, as seen from an end face side thereof. In FIG. 3, Q represents a pole of the cavity 3, and the circles L1 and L2 drawn with dashed lines indicate the parallels of latitude at, respectively, 10 degrees and 8 degrees from the pole Q. The pole Q and the circles L1 and L2 are similarly indicated in subsequent diagrams as well.

The support pin 4 shown in FIGS. 2 and 3 has a pin body 41 with an end face having six dimple-forming projections thereon, and a cross-sectionally circular guide body 42 of larger cross-section than the pin body 41. Also, the pin body 41 has a shape which projects monolithically from an end face of the guide body 42.

The pin body 41 is a member which extends into the cavity 3 to support the center sphere and an end face of which defines a portion of the cavity inner wall when the support pin is in a retracted state. The pin body 41 has a cross-sectional shape with, transferred to the end face thereof, six dimples which have been set on the golf ball surface so as to correspond to the position where the pin body 41 is disposed.

More specifically, the end face of the pin body 41 has a cross-sectional shape wherein three dimple-forming protrusions 43a are arranged in the form of an equilateral triangle, one dimple-forming protrusion 43b is added on the outside of each of these three dimple-forming protrusions 43a, and a land region 44 (a region corresponding to, on the surface of the molded ball, lands where dimples are not formed) of a given width is provided between each of these six dimple-forming protrusions 43a and 43b and a peripheral edge of the end face. Hence, the peripheral edge of the pin body 41 has curved areas which follow the margins of the respective dimple-forming protrusions 43a and 43b, and has a shape in which these mutually adjoining curved areas are connected by gently curved lines. Moreover, because a land region 44 of a given width is provided between the peripheral edge of the end face and the respective dimple-forming protrusions 43a and 43b, the six dimple-forming protrusions 43a and 43b are completely included on the end face.

Here, the shape of the pin body 41 may be suitably set according to the dimple design, and is not subject to any particular limitation. However, from the standpoint of stably supporting the center sphere during molding, it is preferable for the shape to have symmetry, with a shape in which the dimple-forming protrusions are arranged so as to have linear symmetry or rotational symmetry overall being especially preferred. Moreover, in FIGS. 2 and 3, the dimple-forming protrusions 43a and 43b are all circular as seen from above, and have diameters of about 4 mm (the size at which 4 mm diameter dimples form on the surface of the golf ball).

The pin body 41 is not subject to any particular limitation. However, from the standpoint of stably supporting the center sphere 31, it is recommended that the end face preferably include a pole Q of the cavity, and that, more preferably, the pole Q be made to coincide with the center of the end face on the pin body 41. In cases where the end face of the pin body 41 does not satisfy the above conditions, it may be difficult to stably support the center sphere 31. In the example shown in FIGS. 2 and 3, because the dimple-forming protrusions 43a and 43b are arranged to as to have rotational symmetry overall and the center of the end face on the pin body 41 coincides with the center of symmetry of the dimple-forming protrusions 43a and 43b and with the pole Q, the center sphere 31 can be more stably held during molding.

Next, it is recommended that the peripheral edge of the end face on the pin body 41, although not subject to any particular limitation, preferably intersect a parallel of latitude L1 at 10 degrees from the pole Q, and more preferably intersect a parallel of latitude L2 at 8 degrees from the pole Q. The latitude lower limit, although not subject to any particular limitation, may be set to a parallel of latitude at 0.5 degree from the pole Q (not shown). In cases where the foregoing condition is not satisfied, gases near the pole Q may not readily vent during molding, which may result in appearance defects. In the example shown in FIGS. 2 and 3, the peripheral edge of the end face on the pin body 41 curves deeply inward toward the pole Q between mutually adjoining dimple-forming protrusions 43a, intersecting the parallels of latitude at 10 degrees and 8 degrees. As a result, gases vent well near the pole Q.

At the same time, although not subject to any particular limitation, it is recommended that the peripheral edge of the end face on the pin body 41 preferably not exceed the parallel of latitude at 40 degrees from the pole Q, more preferably not exceed the parallel of latitude at 35 degrees, and even more preferably not exceed the parallel of latitude at 30 degrees (these parallels of latitude are not shown in the diagrams). In cases where the peripheral edge of the end face on the pin body 41 exceeds the foregoing parallel of latitude, the cross-section of the pin body 41 becomes too large, as a result of which the material may not spread entirely throughout the space that arises from retraction of the pin body 41 during molding, which may lead to poor filling. Moreover, when the cross-section of the pin body 41 is too large, the cross-sectional size of the guide body 42 must also be increased in keeping with the size of the pin body 41, which may give rise to limitations in the mold design. Here, although not illustrated in the diagrams, the outermost portions of the peripheral edge of the pin body 41 shown in FIGS. 2 and 3 (those portions of the peripheral edge which are positioned furthest from the pole Q) coincide with the parallel of latitude at 23.4 degrees (not shown) from the pole.

The width of the above land region 44 is not subject to any particular limitation, and may be suitably set in accordance with, for example, the dimple design and the mold design. That is, where necessary, areas may be provided where the peripheral edge of the end face of the pin body 41 coincides with the margins of the dimple-forming protrusions.

The number of dimple-forming protrusions formed on the end face of the pin body 41 may be suitably set according to, for example, the dimple design and the mold specifications. A preferred example of the shape of the pin body 41 has been described here in which six dimple-forming protrusions 43a and 43b are formed on the end face of the pin body 41, although the invention is not limited in this regard. That is, it is possible to adopt a configuration wherein, depending on the dimple design, no dimple-forming protrusions are formed on the end face of the pin body 41, in which case the entire end face of the pin body 41 becomes a land region. In cases where dimple-forming protrusions are formed on the end face of the pin body 41, the number of protrusions may be set to preferably one or more, and more preferably two or more. From the standpoint of the stability when holding the center sphere, it is recommended that the number of dimple-forming protrusions provided on the end face be preferably three or more, and especially four or more. The upper limit in the number of dimple-forming protrusions provided on the end face, although not subject to any particular limitation, is preferably not more than twenty, more preferably not more than ten, and even more preferably not more than seven. When the number of dimple-forming protrusions provided on the end face of the pin body 41 is too high, the cross-section of the pin body 41 becomes too large, as a result of which the material may not spread entirely throughout the space that arises from retraction of the pin body 41 during molding, which may lead to poor filling. Moreover, when the cross-section of the pin body 41 is too large, the cross-sectional size of the guide body 42 must also be increased in keeping with the size of the pin body 41, which may give rise to limitations in the mold design.

Figure 4:
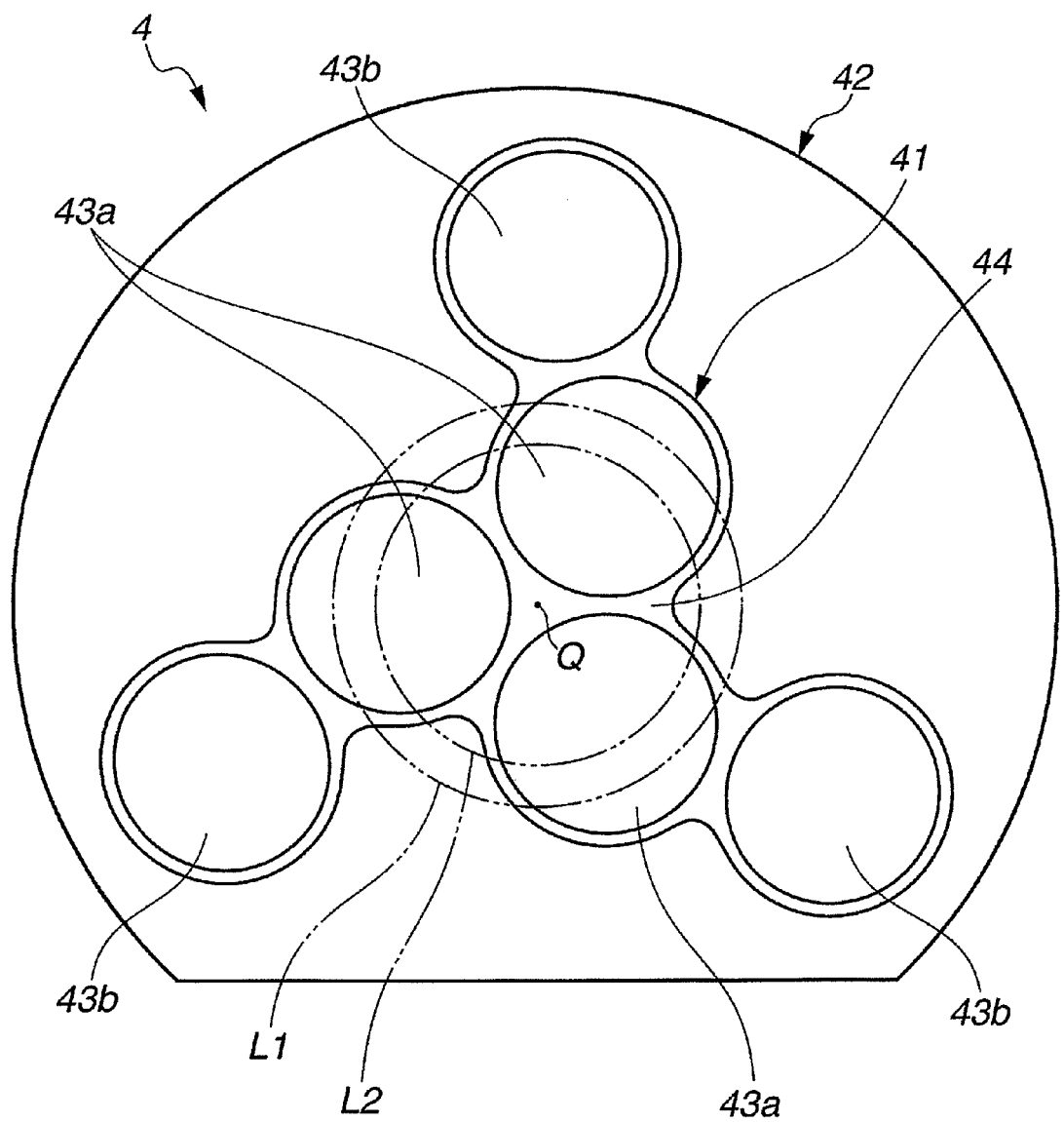
FIG. 4 is a plan view of a support pin in a golf ball mold according to another embodiment of the invention, as seen from the end face side thereof.
Figure 5:
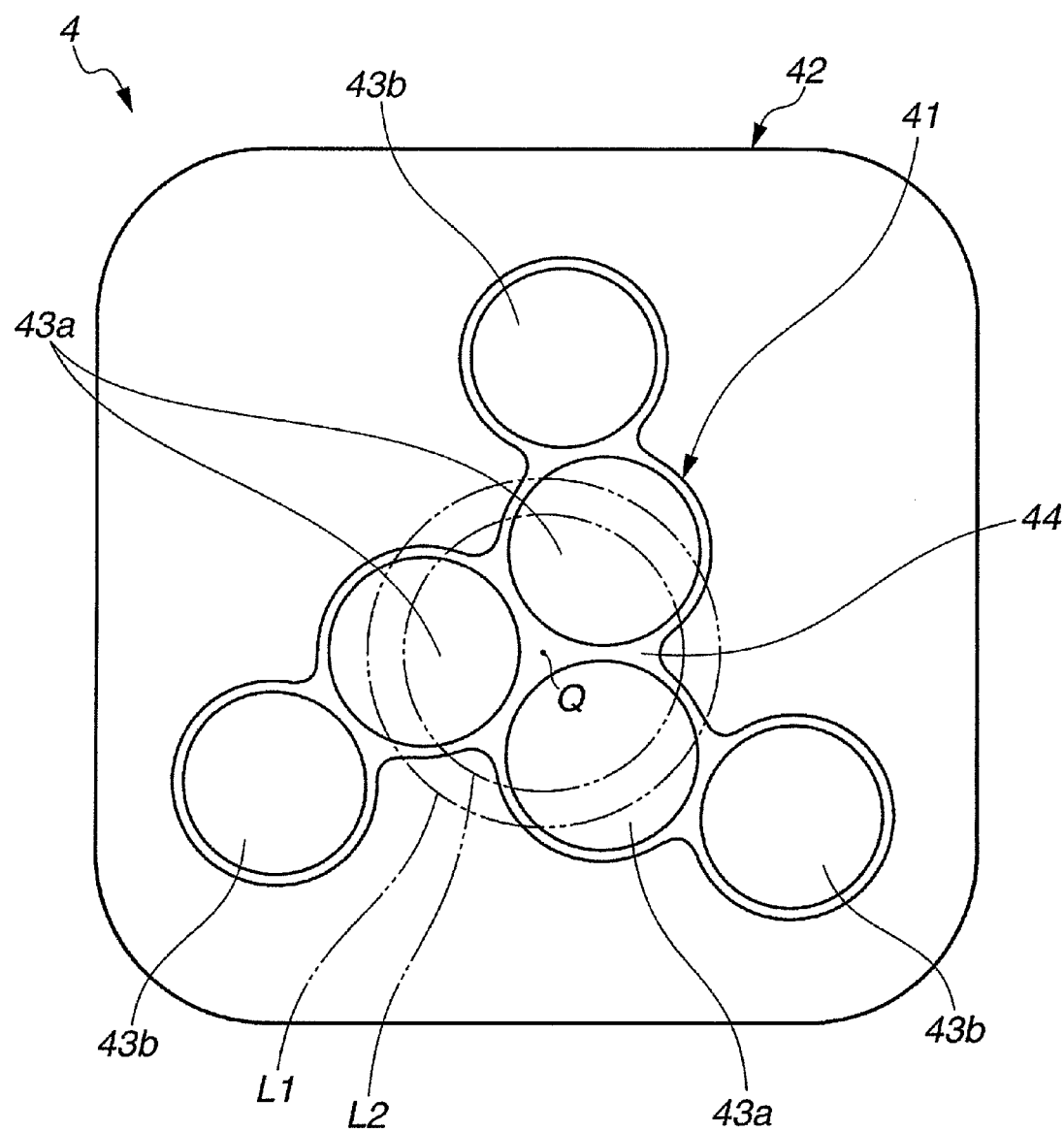
FIG. 5 is a plan view of a support pin in a golf ball mold according to yet another embodiment of the invention, as seen from the end face side thereof.

The guide body 42 is a member which acts as a base supporting the pin body 41 in the support pin 4, the purpose of this member being to restrain movement of the pin body 41 during molding and thereby keep the position of the pin body 41 from shifting. In FIGS. 2 and 3, the guide body 42 is circular in cross-section, with the cross-section being made larger than that of the pin body 41 so that the pin body 41 is completely included on the end face of the guide body 42. In the example shown here, the guide body 42 has a cross-sectional shape which is circular. However, the cross-sectional shape is not subject to any particular limitation, although a simple shape is desirable from the standpoint of machinability. For example, the shape may be one obtained by cutting away part of a circle to form a straight-line portion as shown in FIG. 4, or one having a generally quadrangular shape as shown in FIG. 5. In those cases in particular where the guide body 41 is given a cross-sectional shape having a straight-line portion as mentioned above, shifting of the overall support pin 4 in the rotational direction can be checked and abrasion between the pin body 41 and the pin insertion portion 51 can be further reduced. The cross-sectional size of the guide body 42 is suitably set in accordance with the cross-sectional size and shape of the pin body 41 and is not subject to any particular limitation, provided it is set in such a way that the guide body 42 has a larger cross-section than the pin body 41 and the pin body 41 is completely included on the end face of the guide body 42.

To enable the support pin 4 having the above-described shape to extend into and retract from the mold cavity 3, the mold body 2 has formed therein a pin insertion hole 5 having a pin insertion portion 51 which has a shape corresponding to the pin body 41 and interfits therewith, and having also a guide portion 52 which has a shape corresponding to the guide body 42 and interfits therewith. In the mold 1 of the invention, it is critical for the gap between the guide body 42 and the guide portion 52 to be set so as to be smaller than the gap between the pin body 41 and the pin insertion portion 51. In particular, it is recommended that the gap between the guide body 42 and the guide portion 52 to be set to not more than one-half the size of the gap between the pin body and the pin insertion portion 51. If the gap between the guide body 42 and the guide portion 52 is wider than the gap between the pin body 41 and the pin insertion portion 51, the guide body 42 cannot keep the position of the pin body 41 from shifting, thus hastening abrasion between the pin body 41 and the pin insertion portion 51.

The gap between the pin body 41 and the pin insertion portion 51 and the gap between the guide body 42 and the guide portion 52 are not subject to any particular limitations, although they may be suitably set within ranges which, while satisfying the above-described relationship therebetween, enable the support pin 4 to move smoothly during molding, are able to minimize the formation of flash, and allow gases within the cavity 3 to be rapidly discharged to the exterior. In the present invention, the gap between the pin body 41 and the pin insertion portion 51 may be set to preferably from 5 to 50 µm, and more preferably from 20 to 40 µm, and the gap between the guide body 42 and the guide portion 52 may be set to preferably from 2.5 to 25 µm, and more preferably from 10 to 20 µm. If these gaps are too large, increased shifting of the pin may occur and an increased amount of flash may form. On the other hand, if the gaps are too small, gases within the cavity 3 may be difficult to vent, which may lead to the formation of appearance defects. In the example shown in FIGS. 2 and 3, the gaps between the pin bodies 41 and the pin insertion portions 51 were set to 40 µm, and the gaps between the guide bodies 42 and the guide portions 52 were set to 20 µm. The foregoing gaps may be set so as to be constant throughout the entire circumference, or may be set so as to differ locally according to, for example the cross-sectional shapes of the support pin 4 and the pin insertion hole 5.

In this invention, by setting the gap between the guide body 42 and the guide portion 52 so as to be smaller than the gap between the pin body 41 and the pin insertion portion 51, movement by the pin body 41 is restrained, thus suppressing shifting during molding. In addition, by configuring the support pin 4 such that the pin body 41 projects from the end face of the guide body 42, the rigidity of the support pin 4 as a whole increases. As a result, deflection by the pin body 41 during molding is reduced compared with a conventional support pin 40. In the mold of the invention, because shifting of the pin body 41 is checked by the foregoing effects, abrasion between the pin body 41 and the pin insertion portion 51 can be minimized, thereby resolving the above-described problems during molding.

The length of the pin body 41 formed on the support pin 4, although not subject to any particular limitation, may generally be set in a range of 10 to 40 mm from the end of the support pin 4. If the pin body 41 portion is too short relative to the total length of the support pin 4, the thickness of the inner wall of the cavity 3 will become thin in places, which may lower the mold strength. On the other hand, if the pin body 41 portion is too long, obtaining a pin body 41 deflection-reducing effect during molding may be difficult.

In conventional support pins, the entire support pin must be machined to the same shape as the pin body 41. By contrast, in the present invention, such shaping can be limited to only that portion on the end side of the support pin 4 where it is required. This is particularly effective in cases where the pin body 41 has a complex shape, making it possible, when fabricating the support pin 4, to lower the range over which difficult machining is required, and thus enabling machining costs to be cut.

Figure 6:
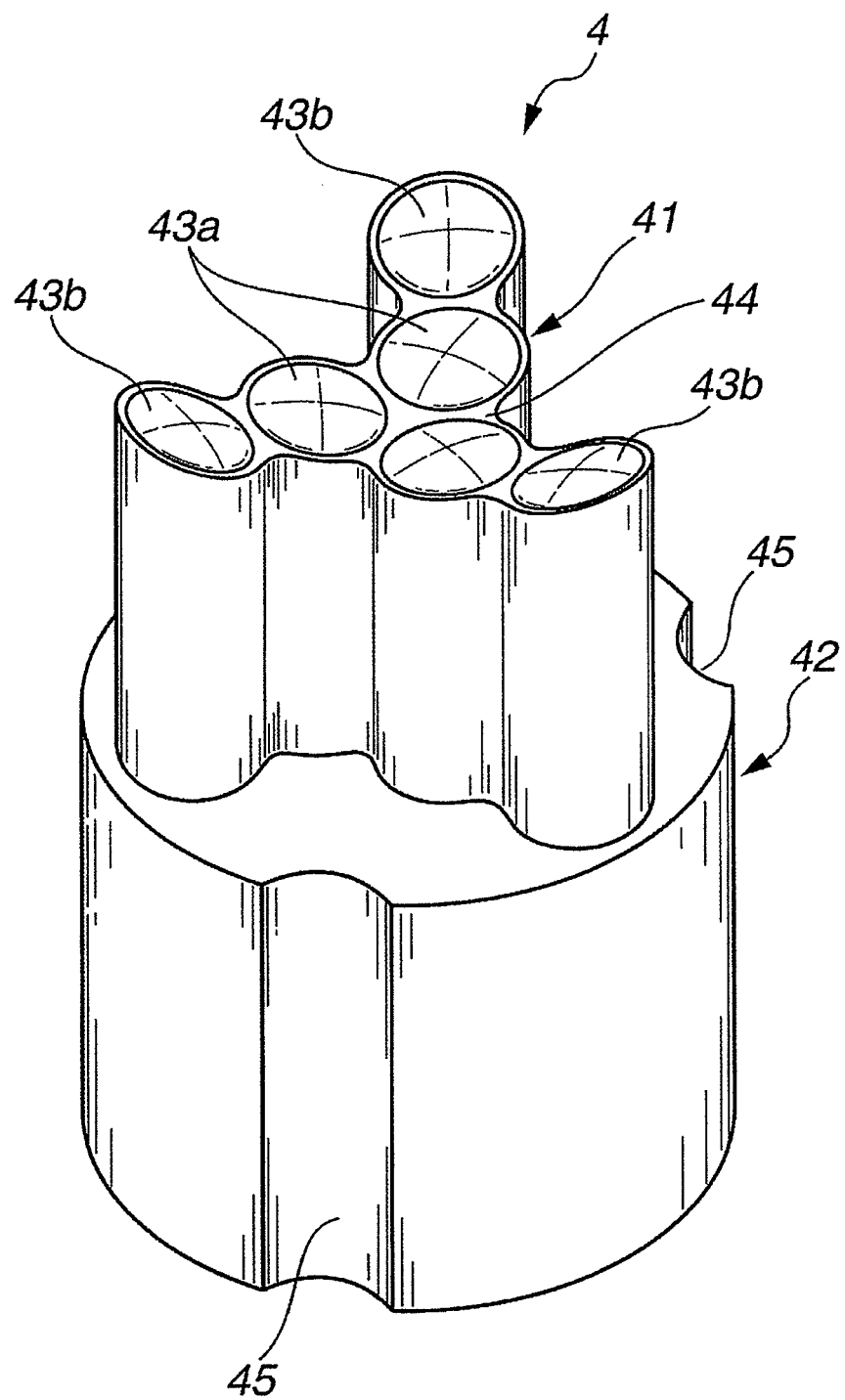
FIG. 6 is an enlarged perspective view of the vicinity of an end portion of a support pin according to another embodiment.
Figure 7:
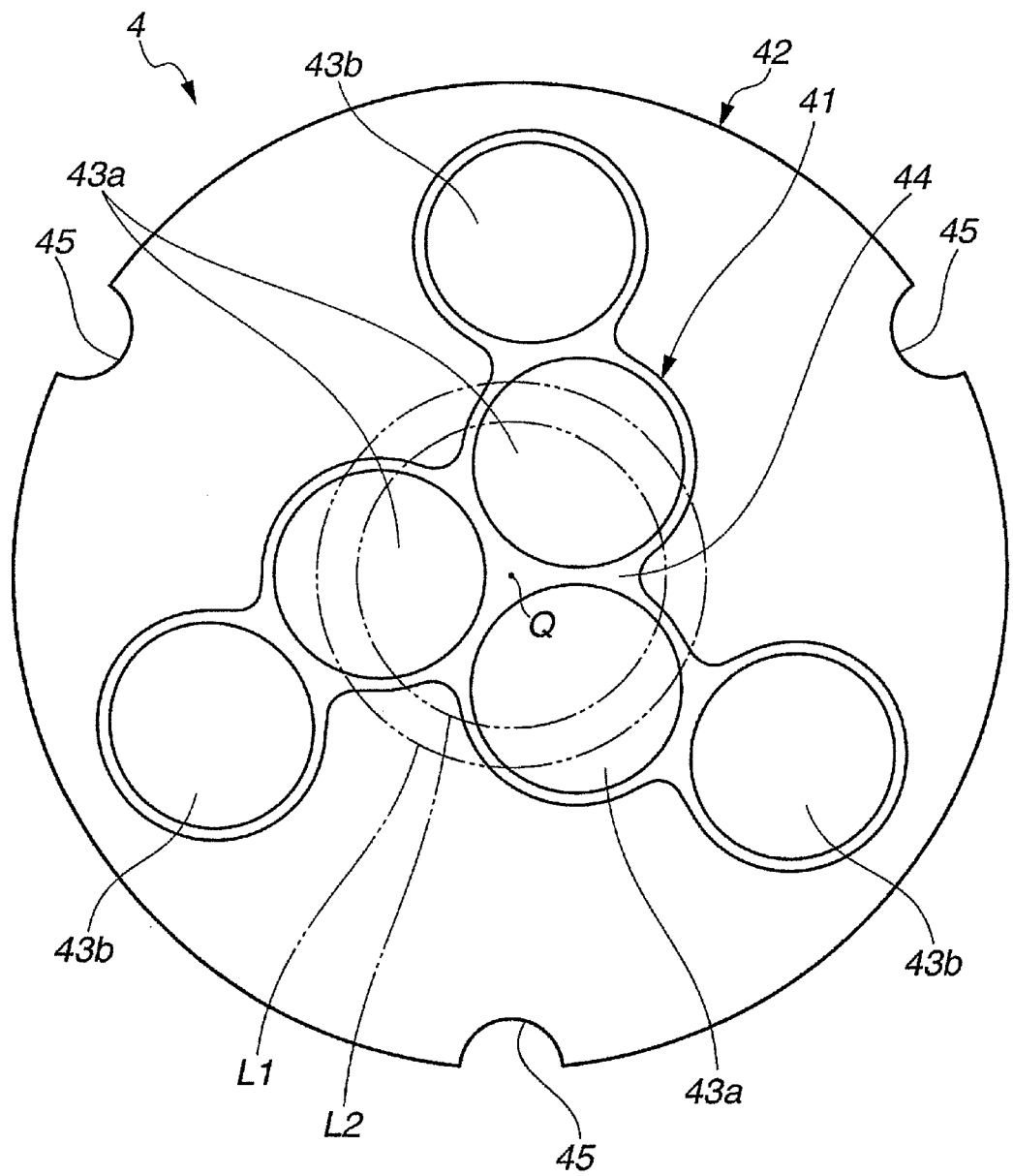
FIG. 7 is a plan view of the support pin shown in FIG. 6, as seen from an end face side thereof.

In this invention, although not subject to any particular limitation, from the standpoint of more rapidly discharging gases from the cavity during molding, it is preferable to form, in a sidewall of the guide body 42, at least one groove which communicates with the exterior. FIGS. 6 and 7 show an example in which grooves which communicate with the exterior have been formed in a sidewall of the guide body portion of the support pin. FIG. 6 is a perspective view showing an example in which a groove 45 having a semicircular cross-sectional shape is formed in the sidewall of the guide body 42 of the support pin 4 shown in FIG. 2. FIG. 7 is a plan view of the support pin 4 shown in FIG. 6, as seen from the end face side. In FIG. 7, Q represents, as similarly noted above, a pole of the cavity 3, and the circles L1 and L2 drawn with dashed lines indicate the parallels of latitude at, respectively, 10 degrees and 8 degrees from the pole Q. The pole Q and the circles L1 and L2 have the same meanings in the subsequent diagrams as well.

In this support pin 4, three grooves 45 having a semicircular cross-sectional shape are evenly formed on the sidewall of the guide body 42. Although not shown here, the grooves 45 are formed along the lengthwise direction of the support pin 4 from the end face of the guide body 42 to a position which communicates with the mold exterior. By forming three grooves 45 on the sidewall of the guide body 42 in this support pin 4, gases within the cavity 3 can be rapidly discharged during molding.

Figure 8:
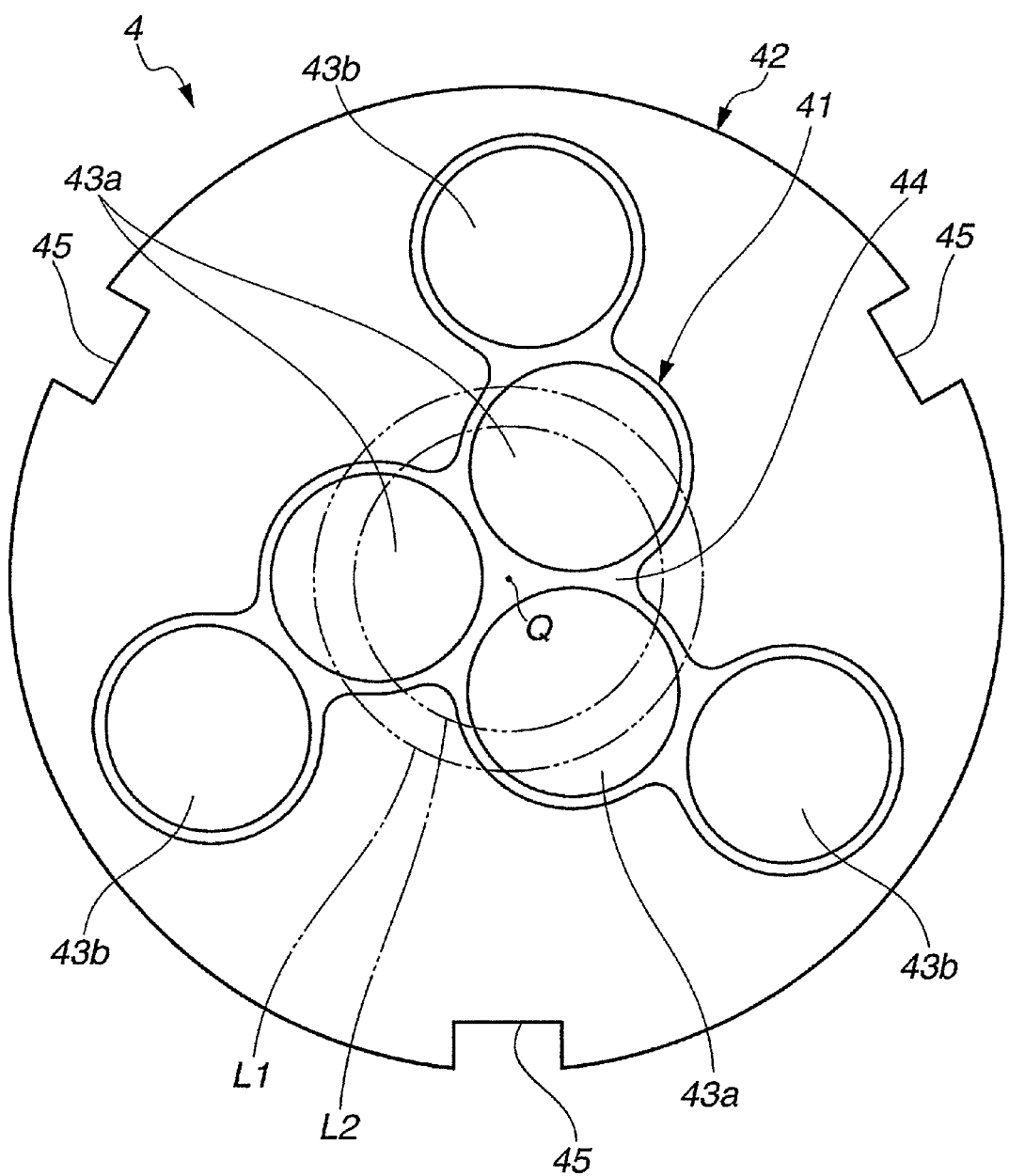
FIG. 8 is a plan view of a support pin in a golf ball mold according to another embodiment of the invention, as seen from the end face side thereof.

The cross-sectional shape, size and positions of the grooves 45 may be suitably set according to such considerations as the diameter and cross-sectional shape of the guide body 42, and are not subject to any particular limitations. However, in this invention, it is recommended that these parameters be set within ranges which do not exert an influence on the rigidity of the overall support pin 4 and do not interfere with the pin body 41. Although it is acceptable for at least one groove 45 to be formed in the sidewall of the guide body 42, from the standpoint of the efficient discharge of gases from within the cavity 3, it is preferable to provide a plurality of grooves evenly along the periphery of the guide body 42. For example, two grooves may be formed at mutually opposed positions on the periphery of the guide body 42 or, as shown in FIGS. 6 and 7, three grooves may be provided at evenly spaced positions along the periphery of the guide body 42. Also, the cross-sectional shape of the grooves 45 is not limited only to the semicircular shape shown in FIGS. 6 and 7, and may instead be, for example, a quadrangular shape as shown in FIG. 8.

Even in cases where the guide body 42 has a cross-sectional shape which is generally quandrangular as shown in FIG. 5, the grooves may be formed in the same way as described above. Examples in which grooves have been formed in the sidewall of the guide body 42 on the support pin 4 shown in FIG. 5 are described below.

Figure 9:
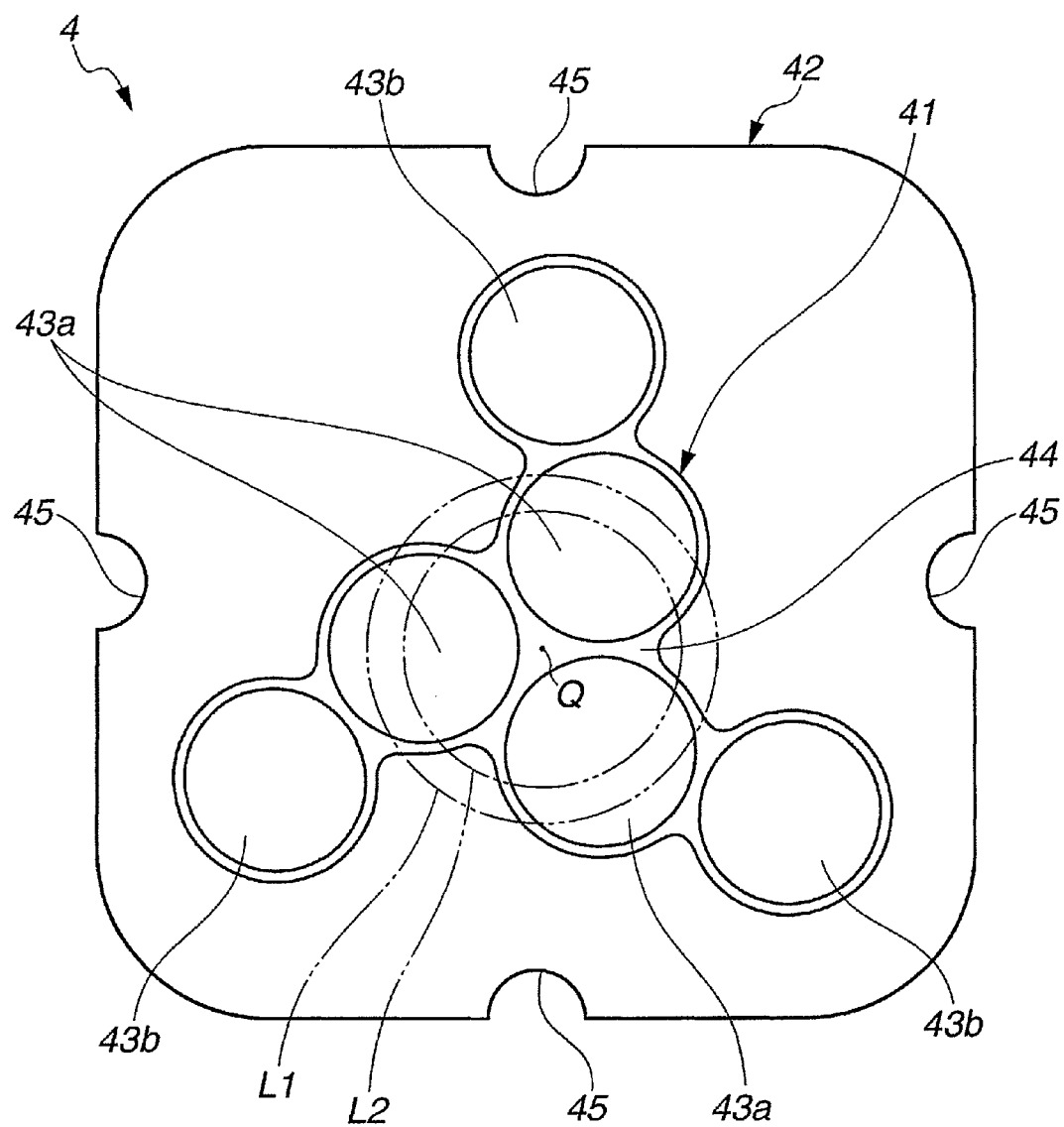
FIG. 9 is a plan view of a support pin in a golf ball mold according to yet another embodiment of the invention, as seen from the end face side thereof.
Figure 10:
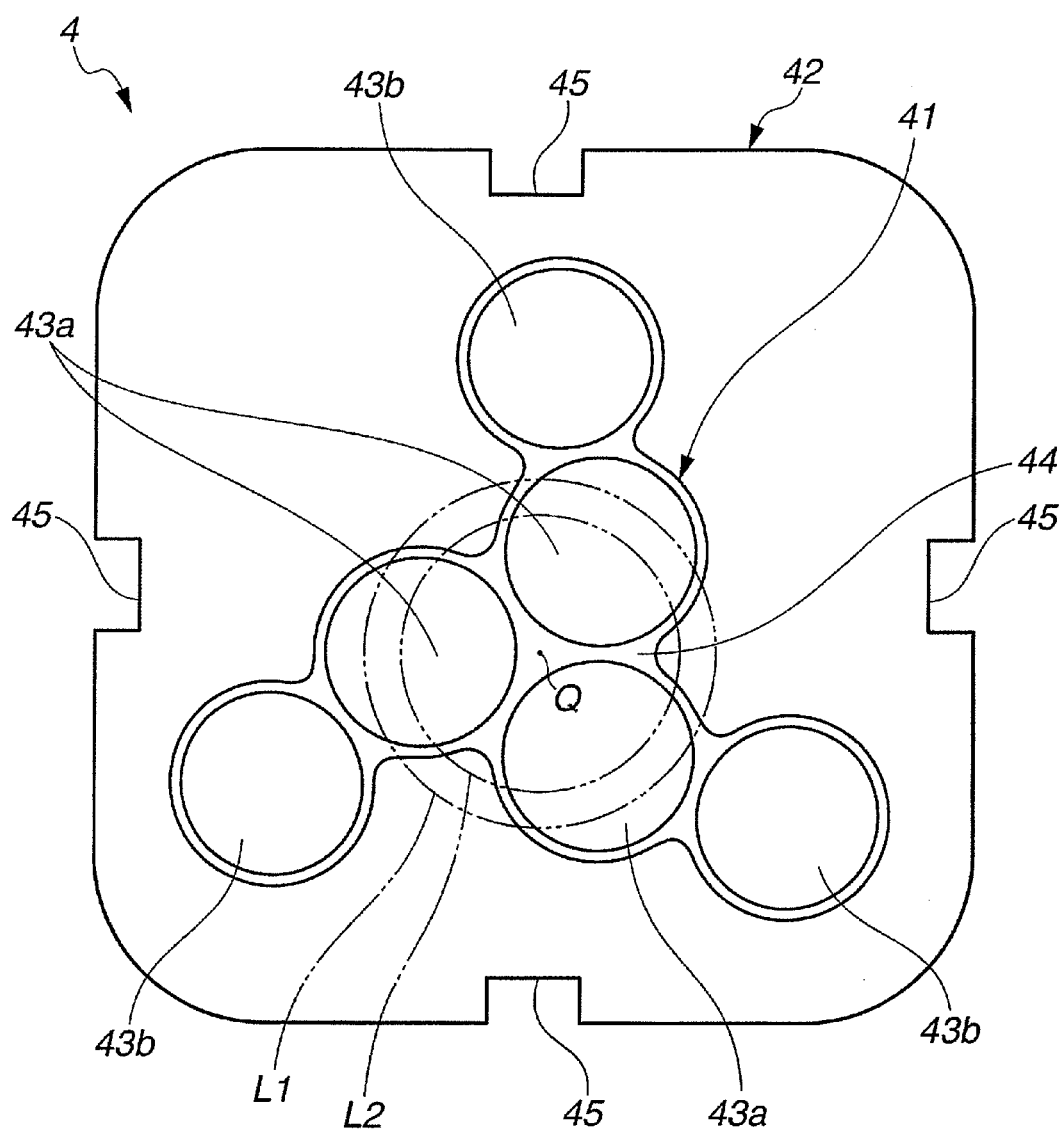
FIG. 10 is a plan view of a support pin in a golf ball mold according to a further embodiment of the invention, as seen from the end face side thereof.
Figure 11:
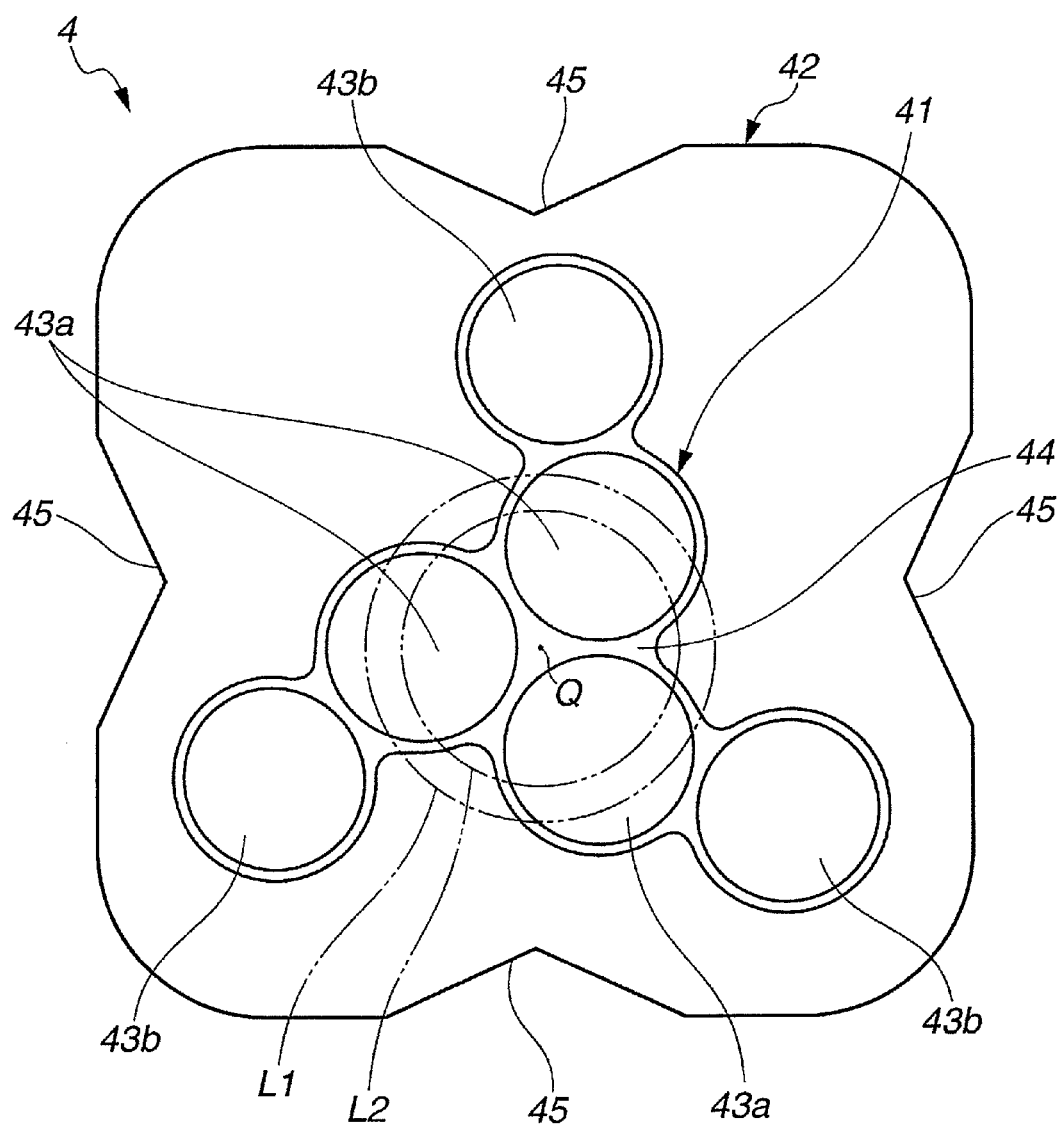
FIG. 11 is a plan view of a support pin in a golf ball mold according to a still further embodiment of the invention, as seen from the end face side thereof.

FIG. 9 is a plan view of a support pin 4 in which grooves 45 have been formed in the side walls of a guide body 42, as seen from the end face side thereof. In FIG. 9, a groove 45 having a semicircular cross-sectional shape has been formed at the center of each side of the guide body 42. In this support pin 4, by forming four grooves 45 in the sidewalls of the guide body 42, gas within the cavity 3 can be more rapidly discharged during molding. Moreover, in this case as well, the cross-sectional shape of the grooves 45 is not particularly limited. For example, instead of the cross-sectionally semicircular grooves 45 described above, grooves 45 having a cross-sectional shape which is quadrangular or triangular such as those shown in FIGS. 10 and 11 may be formed.

The above-described grooves which communicate with the exterior may be formed not only on the guide body 42 of the support pin 4; they may also be formed on the inside walls of the guide portion 52 formed in the mold body 2. Cases in which grooves 53 which communicate with the exterior are formed on the inside walls of the guide portion 52 are concretely described below while referring to the appended diagrams.

Figure 12:
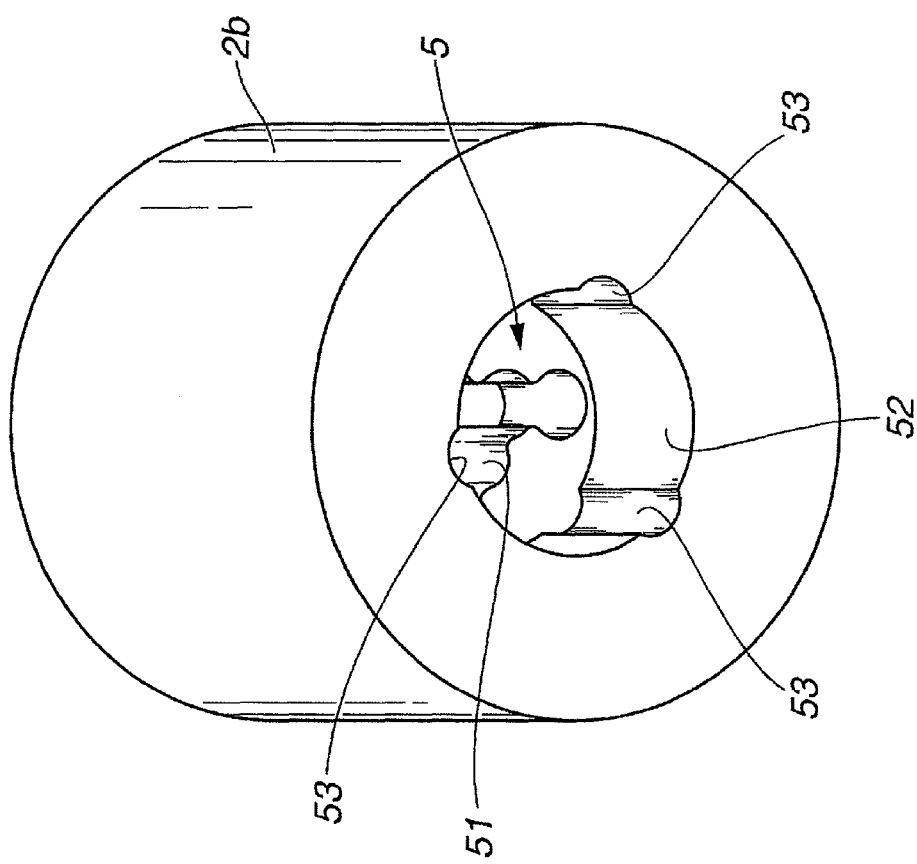
FIG. 12 is a perspective view of a lower mold half of a golf ball mold according to an embodiment of the invention.
Figure 13:
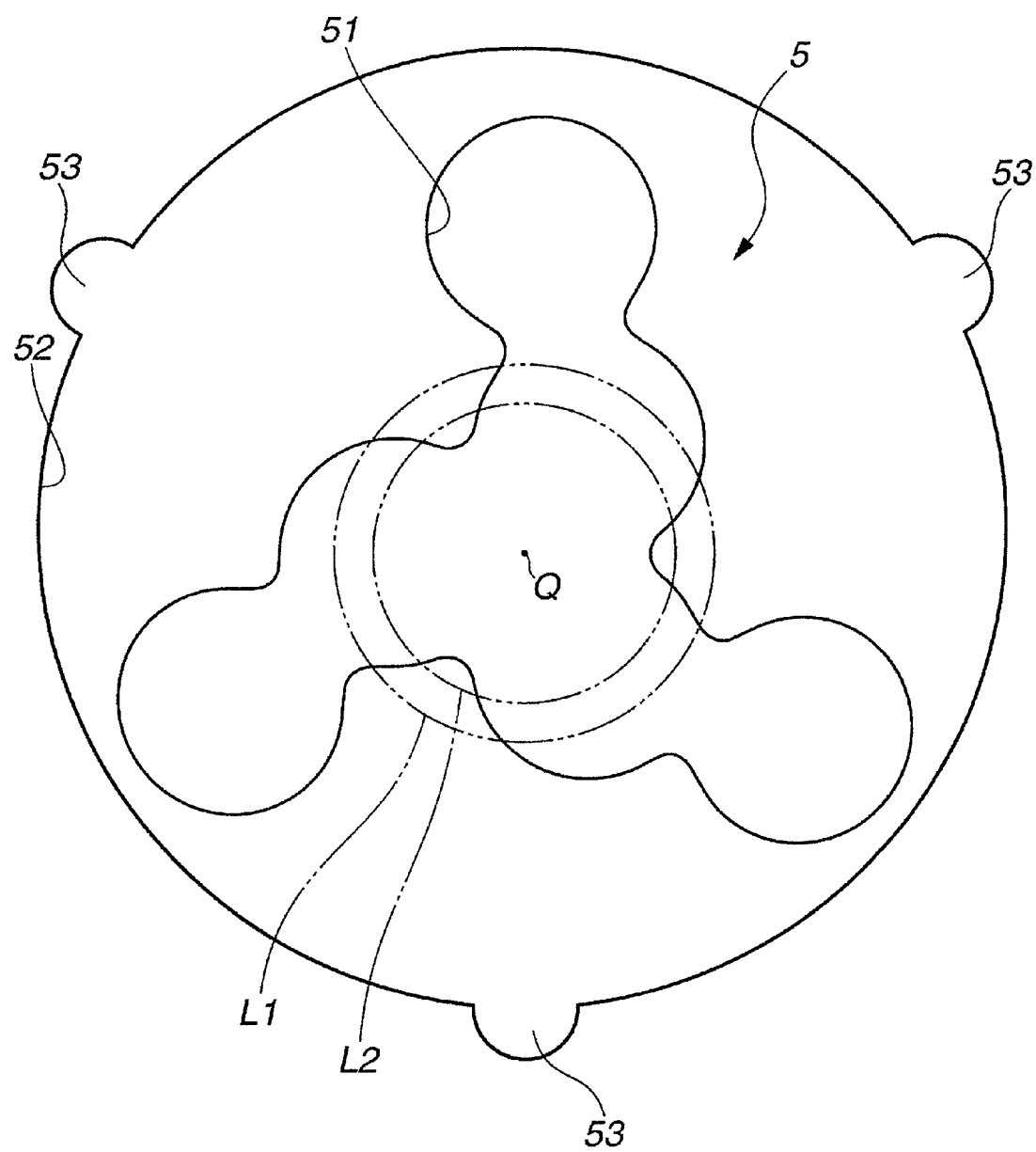
FIG. 13 is a plan view of a pin insertion hole in the lower mold half shown in FIG. 12, as seen from outside the mold.

FIG. 12 is a perspective view of a lower mold half 2*b* in a mold according to one embodiment of the invention. Grooves 53 having a semicircular cross-section are formed on the inside wall of the guide portion 52 of a pin insertion hole 5 that is formed in the lower mold half 2*b*. FIG. 13 is a plan view of the vicinity of the pin insertion hole 5 shown in FIG. 12, as seen from below. The pin insertion hole 5 that is formed in the lower mold half 2*b* shown in FIGS. 12 and 13 has a shape which interfits with the support pin 4 shown in FIGS. 2 and 3. The symbol Q in FIG. 13 represents a pole of the cavity 3, and the circles L1 and L2 drawn with dashed lines indicate the parallels of latitude at, respectively, 10 degrees and 8 degrees from the pole Q. The pole Q and the circles L1 and L2 have the same meanings in the subsequent diagrams as well.

In FIGS. 12 and 13, three grooves 53 of semicircular cross-section are evenly formed on the inside wall of the guide portion 52. The grooves 53 are formed along the lengthwise direction of the guide portion 52, from the innermost part of the guide portion 52 to an outside face of the lower mold half 2*b*, in such a way as to communicate with the exterior. In this case, because the three grooves 53 are formed on the inside wall of the guide portion 52, gases within the mold cavity 3 can be rapidly discharged during molding.

The cross-sectional shape, size and positions of the grooves 53 may be suitably set according to such considerations as the diameter and cross-sectional shape of the guide body 52, and are not subject to any particular limitations. However, in this invention, it is recommended that these parameters be set within ranges which allow gases within the cavity 3 to be efficiently discharged, and also do not exert an influence on the strength of the mold and do not interfere with other structural components such as known pins.

Although it is acceptable for at least one groove 53 to be formed on the inside wall of the guide portion 52, from the standpoint of the efficient discharge of gases from within the cavity 3, it is preferable to provide a plurality of grooves at evenly spaced positions. For example, two grooves may be formed at mutually opposed positions on the inside wall of the guide portion 52, or, as shown in FIGS. 12 and 13, three grooves may be provided at evenly spaced positions on the inside wall of the guide portion 52.

Figure 14:
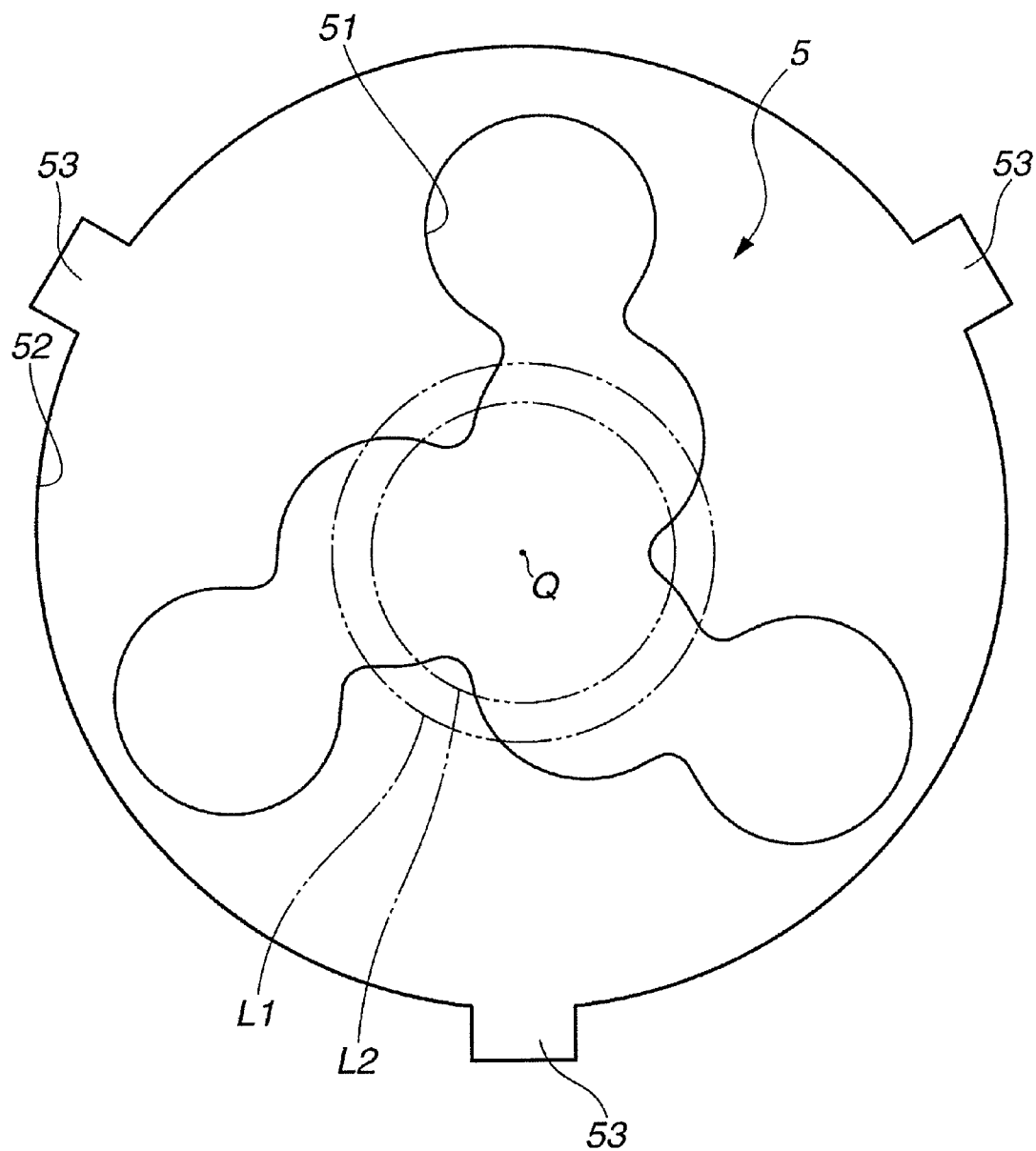
FIG. 14 is a plan view of a pin insertion hole in a golf ball mold according to another embodiment of the invention, as seen from outside the mold.
Figure 15:
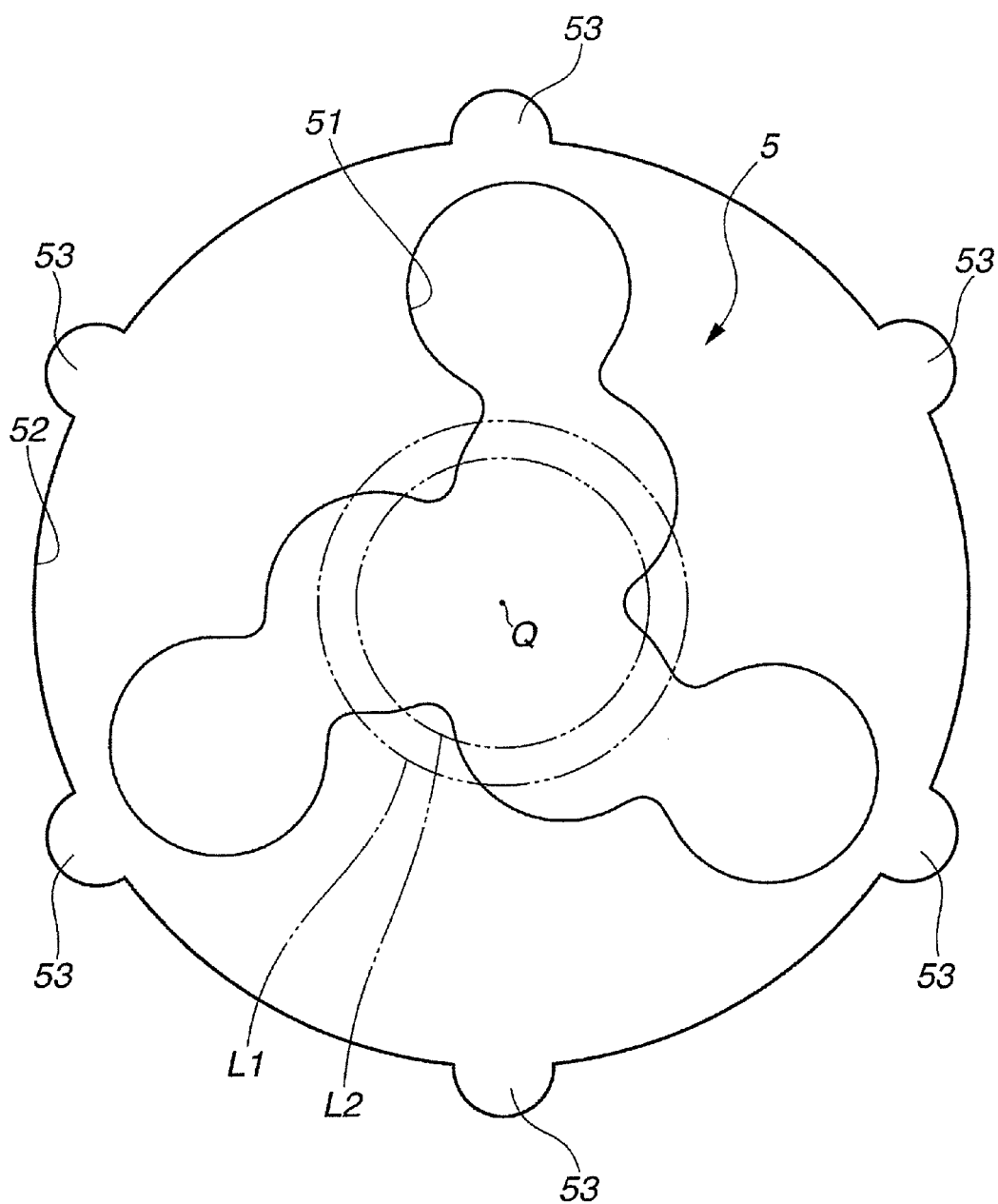
FIG. 15 is a plan view of a pin insertion hole in a golf ball mold according to yet another embodiment of the invention, as seen from outside the mold.
Figure 16:
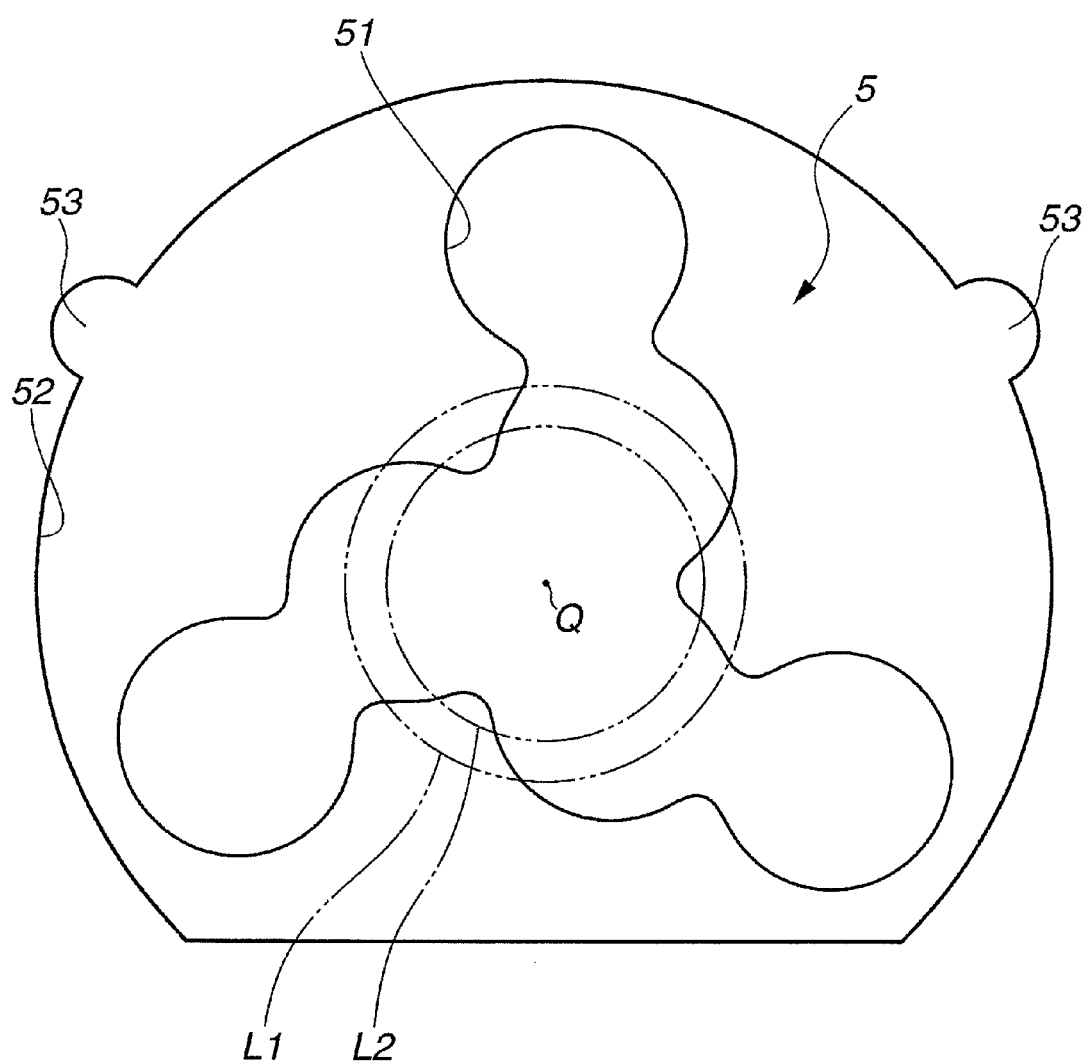
FIG. 16 is a plan view of a pin insertion hole in a golf ball mold according to a further embodiment of the invention, as seen from outside the mold.

In place of the semicircular cross-sectional shape described above, the grooves 53 may have a cross-sectional shape that is quadrangular as shown in FIG. 14. Moreover, as shown in FIG. 15, the number of grooves 53 formed on the inside wall of the guide portion 52 may be changed from three to six. Additionally, in cases where the cross-sectional shape of the guide portion 52 is a shape obtained by cutting away part of a circle to form a straight-line portion, i.e., in cases where the shape is one into which a support pin 4 of the shape shown in FIG. 4 fits, as shown in FIG. 16, two grooves 53 may be evenly formed on the circular portion of the periphery thereof. In either case, because a plurality of grooves 53 are formed on the inside surface of the guide portion 52, gases within the cavity 3 can be rapidly discharged during molding.

On the other hand, even when the guide portion 52 has a cross-sectional shape that is quadrangular, i.e., even in cases where the shape fits the support pin 4 of the shape shown in FIG. 5, grooves can be formed on the inside walls in the same way as described above. Examples in which grooves are formed on the inside walls of a guide portion 52 having a shape which fits the support pin 4 shown in FIG. 5 are described below.

Figure 17:
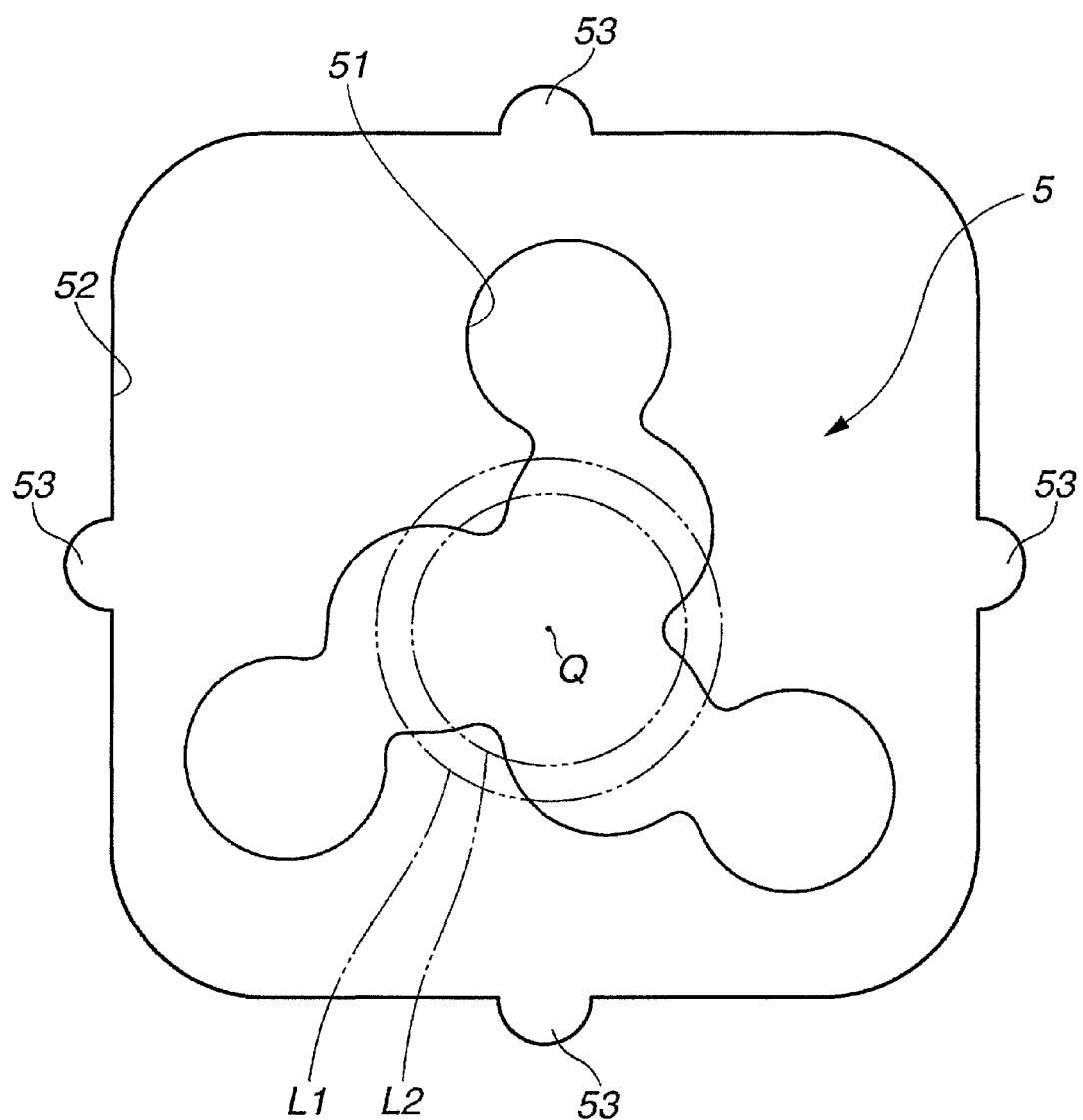
FIG. 17 is a plan view of a pin insertion hole in a golf ball mold according to a still further embodiment of the invention, as seen from outside the mold.
Figure 18:
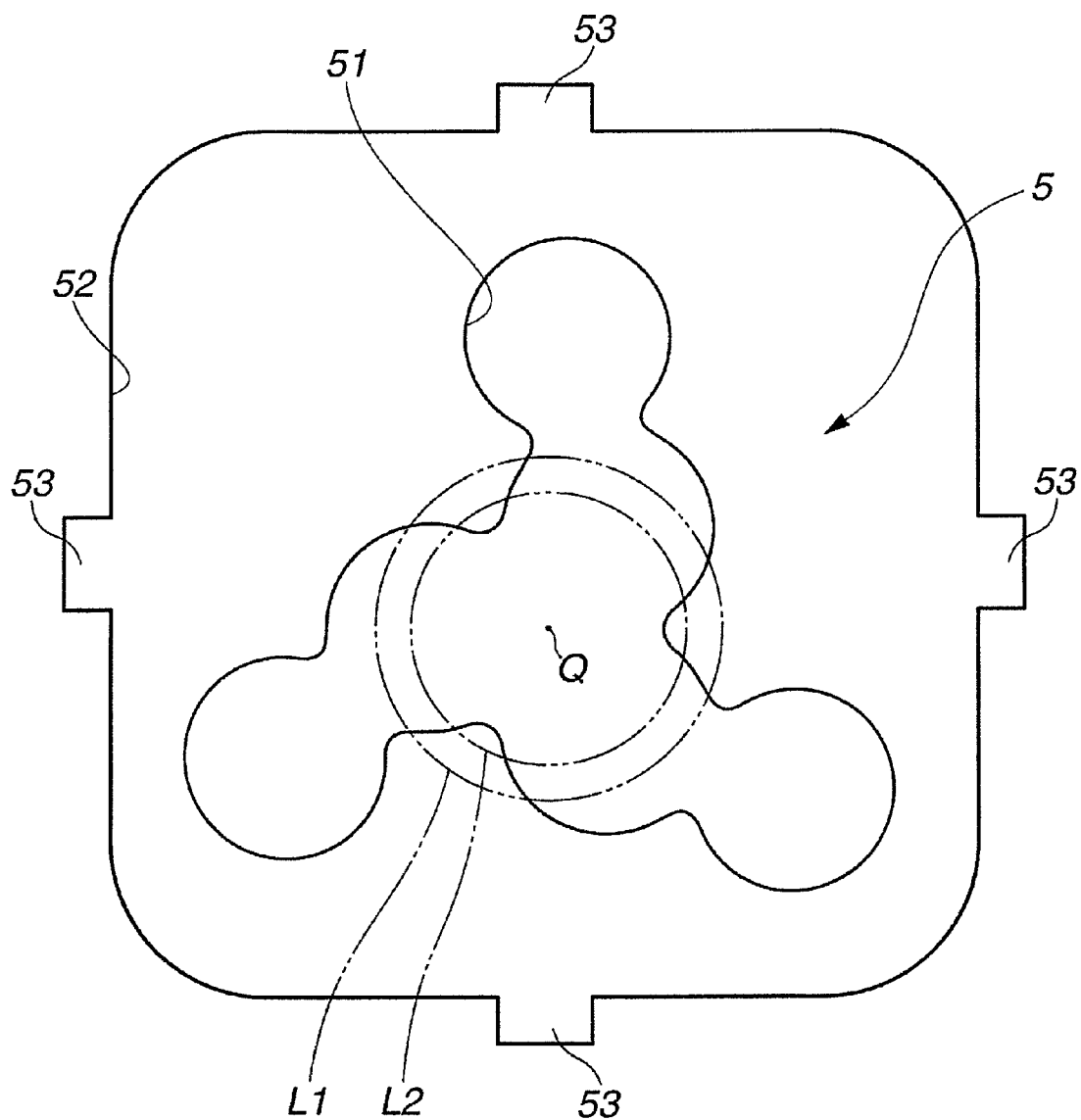
FIG. 18 is a plan view of a pin insertion hole in a golf ball mold according to an additional embodiment of the invention, as seen from outside the mold.
Figure 19:
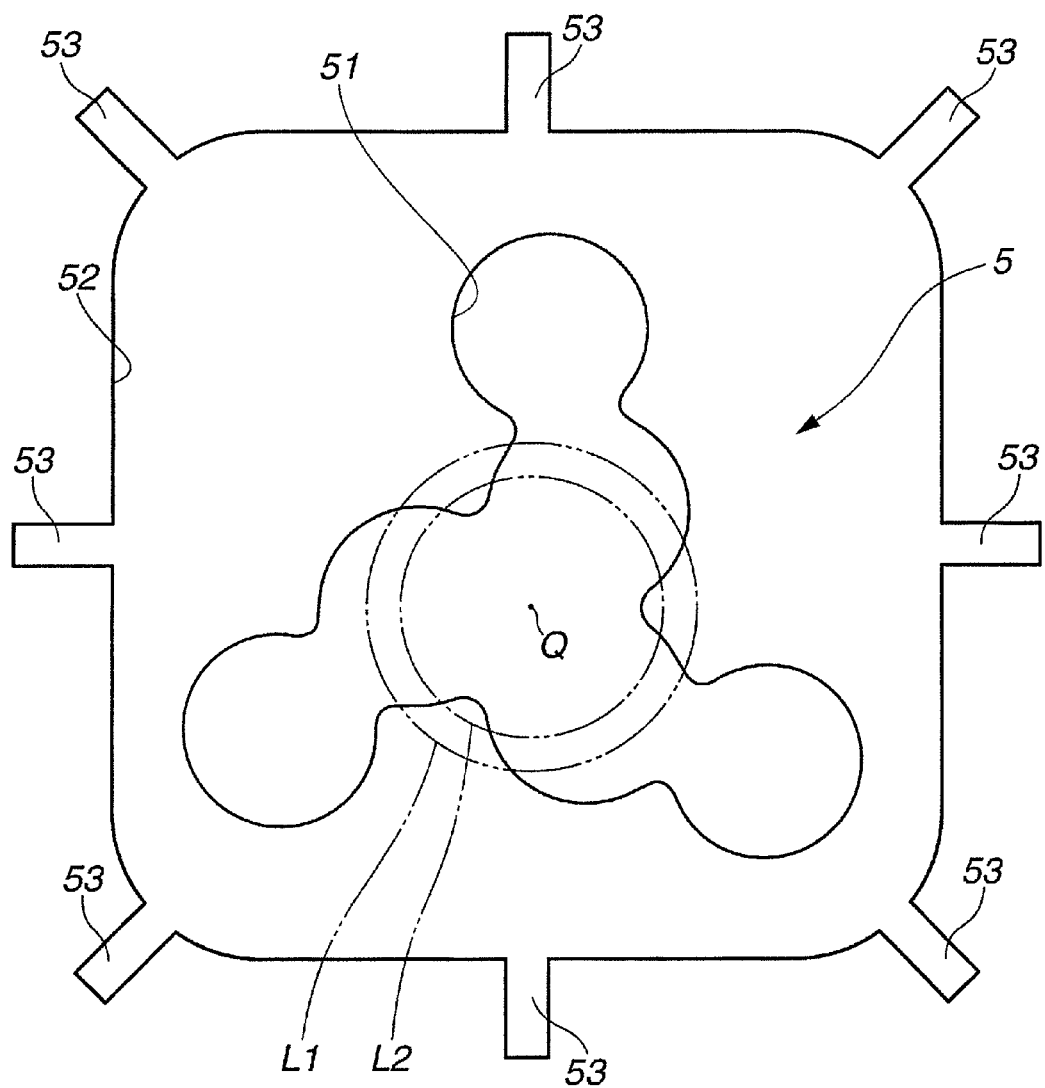
FIG. 19 is a plan view of a pin insertion hole in a golf ball mold according to a further embodiment of the invention, as seen from outside the mold.

FIG. 17 shows a plan view of the vicinity of a pin insertion hole 5 having grooves 53 formed on the inside walls of the guide portion 52, as seen from below the lower mold half b. In FIG. 17, a groove 53 of semicircular cross-sectional shape is formed at the center of each side of the guide portion 52, which is of quadrangular cross-sectional shape. In this case, by forming four grooves 53 on the inside walls of the guide portion 52, gases within the cavity 3 can be rapidly discharged during molding. Moreover, in this case as well, the cross-sectional shape of the grooves 53 is not particularly limited. For example, instead of the cross-sectionally semicircular grooves 53 described above, grooves having a cross-sectional shape which is quadrangular such as those shown in FIG. 18 may be formed. Alternatively, as shown in FIG. 19, a total of eight grooves 53 of quadrangular cross-sectional shape may be formed at the center of each side and at each vertex of the guide portion 52. In these cases as well, because grooves 53 are formed on the inside walls of the guide portion 52, gases within the cavity 3 can be rapidly discharged during molding.

It generally suffices for at least one groove 45 to be formed on a sidewall of the guide body 42 or for at least one groove 53 to be formed on the inside wall of the guide portion 52, although nothing prevents such grooves from being formed on both the guide body 42 and the guide portion 52.

Up until now, a two-part mold wherein the mold body splits into an upper mold half and a lower mold half along the golf ball equator as the parting line, and the upper mold half and low mold half are each provided with one support pin satisfying the conditions of the invention, has been described as a preferred embodiment of the golf ball mold of the invention. However, the number and positions of the support pins provided are not limited to those mentioned in the foregoing examples. For instance, the support pins 40 in the prior-art mold 10 shown in FIG. 22 may be replaced with the support pins shown in FIG. 20 or 21.

Figure 20A:
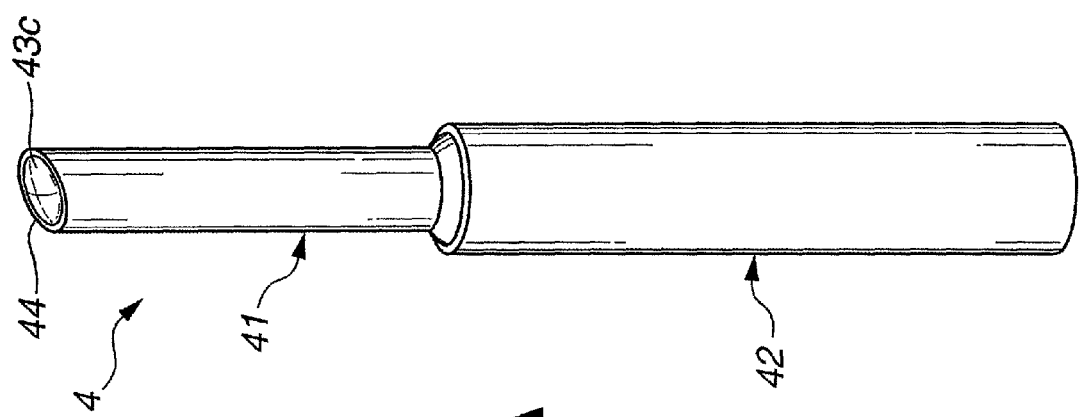
FIG. 20 shows a support pin for a golf ball mold according to yet another embodiment of the invention, FIG. 20A being an enlarged perspective view of the vicinity of the end portion of the support pin and FIG. 20B being a plan view of the support pin shown in FIG. 20A, as seen from an end face side thereof.
Figure 20B:
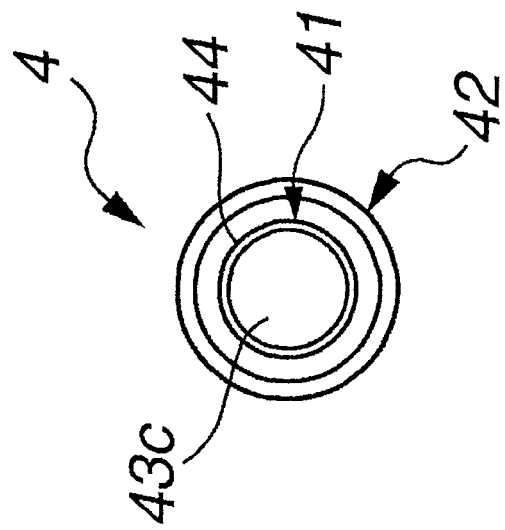
Figure 21A:
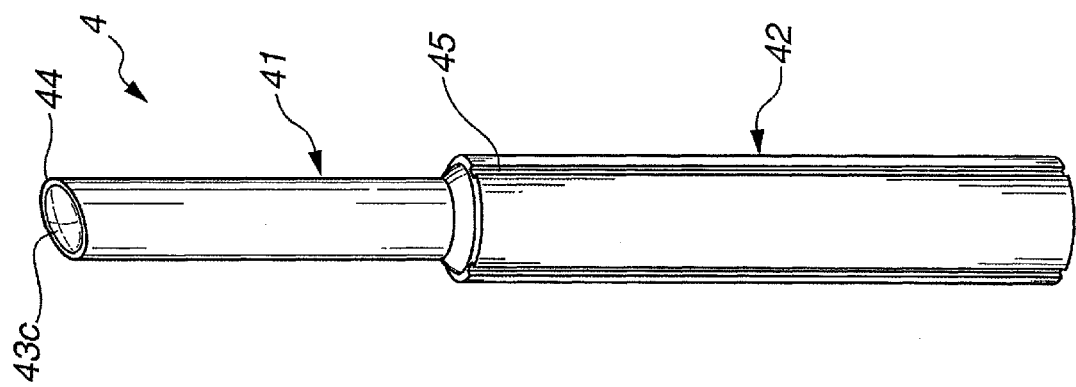
FIG. 21 shows a support pin for a golf ball mold according to a further embodiment of the invention, FIG. 21A being an enlarged perspective view of the vicinity of the end portion of the support pin and FIG. 21B being a plan view of the support pin shown in FIG. 21A, as seen from an end face side thereof.
Figure 21B:
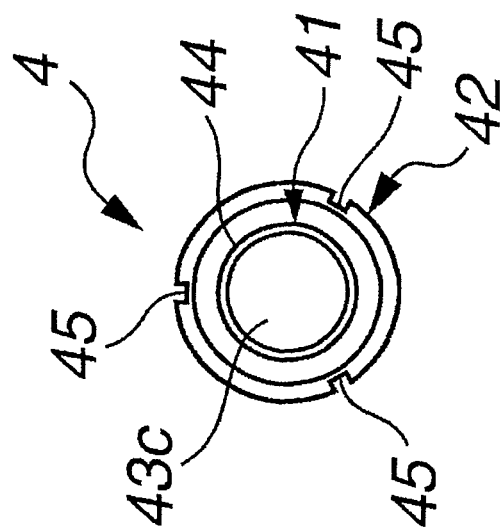
Figure 22:
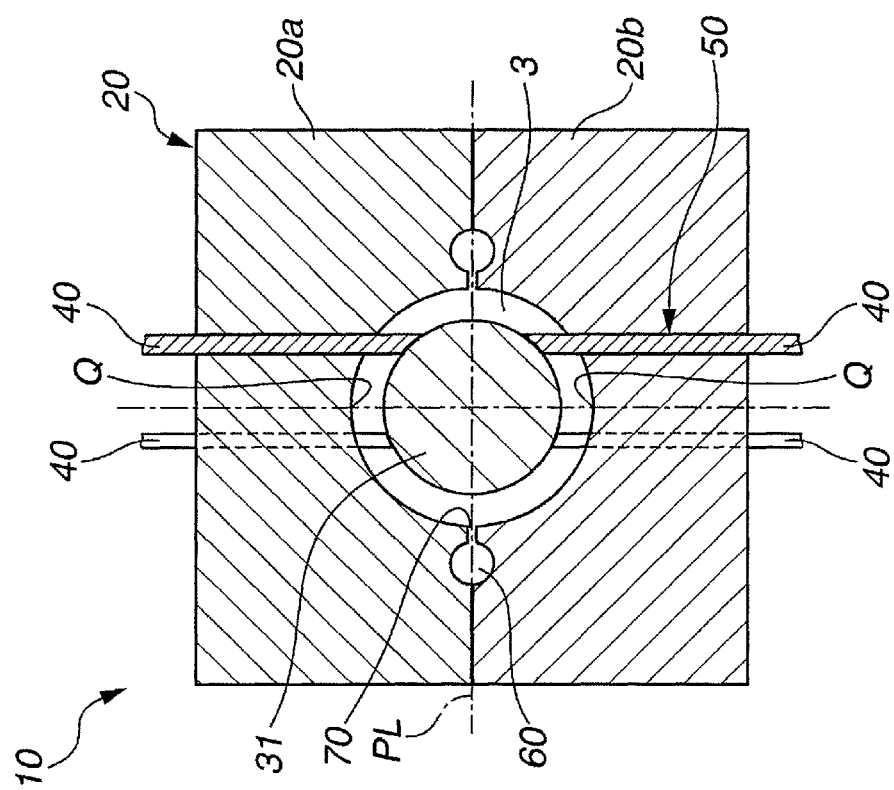
FIG. 22 is a cross-sectional view showing an example of a conventional golf ball mold.

FIG. 20 shows an example of a support pin having a single dimple-forming protrusion provided on an end face of the pin body. Here, FIG. 20A is an enlarged perspective view of the vicinity of the end portion of the support pin 4, and FIG. 20B is a plan view of the support pin 4 shown in FIG. 20A, as seen from an end face side thereof. FIG. 21 shows an example in which grooves 45 communicating with the exterior have been formed in the sidewall of a guide body 42 of the support pin 4 shown in FIG. 20. Here, FIG. 21A is an enlarged perspective view of the vicinity of the end portion of the support pin 4, and FIG. 21B is a plan view of the support pin 4 shown in FIG. 21A, as seen from an end face side thereof.

These support pins 4 have a single dimple-forming protrusion 43c formed on the end face of the pin body 41. By having a guide body 42 with a larger cross-section than the pin body 41, the rigidity of the support pin as a whole increases. As a result, deflection and shifting by the pin body 41 is reduced, enabling production problems caused by such deflection and shifting to be resolved. In particular, the support pin 4 shown in FIG. 21 has grooves 45 formed in the sidewall of the guide body 42, enabling gases within the cavity 3 to be rapidly discharged during molding.

In this case as well, although not shown in the diagrams, if necessary, grooves which communicate with the exterior may be formed on the inside wall of the guide portion into which the guide body 42 fits. Moreover, in cases where, for reasons having to do with the dimple design or the mold design, there is no need to provide a dimple-forming protrusion 43c on the end face of the pin body 41, the entire end face of the pin body may be a land region.

The material used in the golf ball mold of the invention may be a known material, and is not subject to any particular limitation.

When a golf ball is molded using the golf ball mold of the invention, molding may be carried out by a method and under conditions similar to those employed when using a conventional mold. More specifically, when the two-part mold 1 shown in FIG. 1 is used, first, a center sphere 31 is placed inside the cavity 3 of the mold 1 and the center sphere 31 is supported by support pins 4 provided in the mold 1. Next, a known cover-forming material is injected, via runners 6 and resin injection ports 7, between the center sphere 31 and the inner wall of the cavity 3, and the support pins 4 are retracted. Cooling and solidification are then carried out, following which the upper and lower mold halves are separated and the molded article is removed. The resulting molded article is gate cut and trimming is carried out in the usual manner to remove flash, thereby giving a golf ball having a cover of one, two or more layers formed over a core. To enhance the design and durability of the golf ball, the surface of the golf ball thus obtained may be subjected to various treatments such as stamping and painting by known methods.

The cover-forming material used here may be a known thermoplastic resin and is not subject to any particular limitation, although preferred use may be made of an ionomer resin or a urethane resin. The thickness of the cover formed may be suitably selected according to, for example, the construction and materials of the golf ball to be manufactured, and is not subject to any particular limitation.

In the golf ball manufactured by the above method, the shape, number and arrangement of the dimples formed on the surface may be suitably set according to the ball specifications, and are not subject to any particular limitation. For example, the dimple shape is not limited to a circular shape, and may also be suitably selected from among non-circular shapes such as polygonal, teardrop and oval shapes. The dimple diameter, although not subject to any particular limitation, is preferably set in a range of from 0.5 to 6 mm. The dimple depth, although likewise not subject to any particular limitation, is preferably set in a range of from 0.05 to 0.4 mm.

The surface coverage by dimples on the surface of the ball is not subject to any particular limitation. However, from the standpoint of the aerodynamic properties, this value is set to preferably at least 70%, more preferably at least 75%, and even more preferably at least 80%. By using the mold of the invention, balls having a high surface coverage can easily be manufactured.

Although preferred embodiments of the invention have been described above in conjunction with the diagrams, the golf ball mold of the invention is not limited by the diagrams and the above embodiments and may be suitably modified within the spirit and scope of the present invention. That is, the shapes of the parting surfaces of the mold, the number of parts into which the mold splits, and the number and positioning of the support pins specified in the invention may be varied within ranges that do not depart from the spirit and scope of the invention. For example, in the mold shown in FIG. 1, the support pins 4 provided in the upper mold half 2a and the lower mold half 2b need not necessarily be of the same shape, and may be given differing shapes according to, for example, the dimple design. By way of illustration, one could, for instance, adopt a construction wherein the support pin shown in FIGS. 2 and 3 is provided in the upper mold half 2a and the support pin shown in FIG. 4 is provided in the lower mold half 2b. In addition, it is also possible to optionally add known pins and the like.

As explained above, the golf ball mold of the present invention, by being provided with a support pin having a shape which satisfies certain conditions, is able to suppress deflection and shifting of the support pin during molding, and thus can minimize abrasion of the mold body and the support pin. Consequently, the formation of uneven flash caused by deflection and shifting of the support pin, the occurrence of appearance defects in the molded article that arise due to damage to the inner wall side of the cavity and contamination of the molded article due to rubbing debris can all be minimized, enabling the maintenance period and life of the mold to be further extended. Hence, good molded articles can be obtained without interruption, helping to improve golf ball productivity. In addition, because there is no need to separately fabricate the gas-venting pins that have described in the prior art, the mold of this invention is superior also in terms of cost.

The invention claimed is:

1. A mold for molding golf balls, comprising a mold body configured as a plurality of mold parts which have at least a parting surface defining a parting line along a golf ball equator and removably mate to form a cavity having an inner wall with a plurality of dimple-forming protrusions thereon, and a support pin which is extendable into and retractable from the cavity, the support pin extending into the cavity to support a center sphere and an end face of the support pin defining a portion of the cavity inner wall when the support pin is in a retracted state, wherein the support pin comprises a pin body which extends into the cavity to support the center sphere and has an end face that defines a portion of the cavity inner wall when the support pin is in a retracted state, and a guide body which is of larger cross-section than the pin body and has an end face from which the pin body projects;

the mold body has formed therein a pin insertion hole comprising a pin insertion portion into which the pin body fits and a guide portion into which the guide body fits; and the guide body and the guide portion have a gap therebetween and the pin body and the pin insertion portion have a gap therebetween, such that the gap between the guide body and the guide portion is smaller than the gap between the pin body and the pin insertion portion, wherein the end face of the pin body includes a pole of the cavity and has a peripheral edge which intersects a parallel of latitude at 10 degrees from the pole.

2. The golf ball mold of claim 1, wherein the gap between the guide body and the guide portion is not more than one-half as large as the gap between the pin body and the pin insertion portion.

3. The golf ball mold of claim 1, wherein the guide body has formed, on a sidewall thereof, at least one groove which communicates with a mold exterior.

4. The golf ball mold of claim 1, wherein the guide portion has formed, on an inside wall thereof, at least one groove which communicates with a mold exterior.

5. The golf ball mold of claim 1, wherein the pin body is shaped in such a way that the end face thereof has one or more dimple-forming protrusion thereon.

6. The golf ball mold of claim 5, wherein the pin body is shaped in such a way that the end face thereof has two or more dimple-forming protrusions thereon.

\* \* \* \* \*